United States Patent
Kaspers et al.

(10) Patent No.: US 7,862,746 B2
(45) Date of Patent: Jan. 4, 2011

(54) STABILIZATION OF NATURAL COMPOSITES

(75) Inventors: Sarah R. Kaspers, Scarsdale, NY (US); Christian Guckel, Bad Saeckingen (DE); Daniel Rogez, Mulhouse (FR); Christian M. Schaller, Basel (CH)

(73) Assignee: BASF SE., Ludwigschafen (DE)

( * ) Notice: Subject to any disclaimer, the term of this patent is extended or adjusted under 35 U.S.C. 154(b) by 832 days.

(21) Appl. No.: 11/352,873

(22) Filed: Feb. 13, 2006

(65) Prior Publication Data

US 2006/0183821 A1 Aug. 17, 2006

Related U.S. Application Data

(60) Provisional application No. 60/653,170, filed on Feb. 15, 2005.

(51) Int. Cl.
B23B 15/08 (2006.01)

(52) U.S. Cl. .................. 252/397; 524/13; 252/401

(58) Field of Classification Search ............. 524/13; 252/397
See application file for complete search history.

(56) References Cited

U.S. PATENT DOCUMENTS

| | | | |
|---|---|---|---|
| 6,187,387 B1 | 2/2001 | Bolle et al. | 427/408 |
| 6,254,724 B1 * | 7/2001 | Seltzer et al. | 162/70 |
| 6,290,885 B1 | 9/2001 | Roetheli et al. | 264/108 |
| 6,511,757 B1 | 1/2003 | Brandt et al. | 428/532 |
| 6,650,303 B2 | 11/2003 | Kim et al. | 343/895 |
| 6,653,324 B1 | 11/2003 | Kohler et al. | 514/315 |
| 2002/0056534 A1 | 5/2002 | Thomas | 162/72 |
| 2003/0022966 A1 * | 1/2003 | Leitz et al. | 524/99 |
| 2003/0121630 A1 | 7/2003 | Yuan et al. | 162/135 |
| 2003/0176538 A1 * | 9/2003 | Wu et al. | 524/13 |
| 2004/0076847 A1 | 4/2004 | Saunders, Jr. et al. | 428/535 |
| 2004/0235983 A1 | 11/2004 | Stadler et al. | 523/122 |
| 2005/0148698 A1 | 7/2005 | Ratzsch et al. | 524/35 |
| 2006/0036004 A1 | 2/2006 | Wu et al. | 524/13 |

FOREIGN PATENT DOCUMENTS

| | | |
|---|---|---|
| EP | 0 943 665 | 9/1999 |
| WO | 03/054068 | 7/2003 |

OTHER PUBLICATIONS

"Plastics Additives Handbook" $4^{th}$ edition, R. Gachter et al. ed., Hanser Publishers, New York, pp. 129-263, (1993).
Falk, R. H. et al., Natural Polymers and Composites, Proc. $3^{rd}$ Int. Symposium on Natural Polymers and Composites, Sao Pedro, Brazil, May 14-17, 2000, 382-385.
Stark, Nicole M. et al, Annual Technical Conference, Soc. Plast. Eng, $60^{th}$/vol. 2, (2002), 2209-2213.

* cited by examiner

*Primary Examiner*—Harold Y Pyon
*Assistant Examiner*—Timothy Chiang
(74) *Attorney, Agent, or Firm*—Shiela A. Loggins

(57) ABSTRACT

The invention relates to a method of stabilizing natural composites against damage by heat and light by treating the wood derived fillers with a water based solution of a sterically hindered amine, drying the treated wood derived filler and then combining with plastic via compounding methods such as extrusion.

21 Claims, No Drawings

STABILIZATION OF NATURAL COMPOSITES

The application claims the benefit of U.S. Provisional Ser. No. 60/653,170, filed on Feb. 15, 2005 herein incorporated entirely by reference.

BACKGROUND OF THE INVENTION

1. Field of the Invention

The invention relates to a method of stabilizing natural composites or wood polymer composites (WPC) against damage by heat and light by treating the wood derived fillers or flour with a water based solution, suspension dispersion or emulsion of a sterically hindered amine, drying the treated wood derived filler and then combining with plastic via compounding methods such as extrusion.

2. Description of Related Art

Natural product composites, for example wood/plastic composites, are well known in the art. They may for example be natural fiber/plastic composites as disclosed in U.S. Pat. Nos. 6,290,885 and 6,511,757 hereby incorporated by reference.

Wood is a complex polymeric material containing essentially cellulose, hemicellulose and lignin. Lignin itself is a complex mixture of high molecular weight products which are derived from conyferyl alcohol.

Particularly lignin causes discoloration and undergoes degradation upon exposure to actinic radiation.

Polymeric materials are well known to degrade upon the action of sunlight. Hindered amines are well known stabilizers for polymers and sunlight protectants. See "Plastics Additives Handbook" $4^{th}$ edition, R. Gachter et al. ed., Hanser Publishers, New York, pp. 129-263, (1993).

It is known to stabilize wood surfaces by applying hindered amines or nitroxyls to a wood substrate. For example EP-A-943 665 discloses a wide range of sterically hindered amine N-oxyls or N-hydroxyls which are applied to the wood substrate as solutions, suspensions or dispersions comprising at least one organic solvent.

U.S. Pat. Nos. 6,187,387 and 6,653,324 disclose the use of sterically hindered amine N-oxyls or N-hydroxyls or salts thereof which are applied directly or via impregnation to a wood substrate and are herein incorporated by reference.

U.S. Pat. Nos. 6,254,724 and 6,650,303 disclose the use of nitroxides and hydroxylamines in the stabilization of paper or pulp.

U.S. published applications 2002056534 and 2003121630 discuss a method for the production of colored light-stable, lignocellulosic material.

Attempts have been made to stabilize natural product composites by using hindered amine light stabilizers. See for example, Falk, R. H. et al., Natural Polymers and Composites, Proc. $3^{rd}$ Int. Symposium on Natural Polymers and Composites, Sao Pedro, Brazil, May 14-17, (2000), 382-385.

Star, Nicole M. et al, Annual Technical Conference, Soc. Plast. Eng., $60^{th}$/Vol. 2, (2002), 2209-2213 shows compositions of wood flour and high density polyethylene in combination with hindered amines.

U.S. application publication number US 20040235983 discloses natural product composites protected against weathering and color formation by the incorporation of sterically hindered amines into the polymer-wood matrix.

U.S. application publication number US 20040076847 discloses pretreated wood filler with pigment and/or dyes before incorporation into a composite.

It has now been found that selected sterically hindered amines have an improved stabilizing activity against light-induced degradation of wood-polymer composites if they are applied directly to the cellulosic or wood component of the composite prior to combining the cellulosic or wood component with the plastic or polymeric component of the composites. The application of the solution, suspension or dispersion of hindered amines onto the cellulosic material occurs in the absence of matrix polymer. The treated cellulosic material is then combined with the polymer to form the composite.

While not wishing to be bound by any theory, it is known that hindered amines function as good radical scavengers. It is further believed that the prior impregnation of the cellulosic or wood component with the hindered amine places the radical scavenger at the lignin sites and thus provides the most effective protection for the lignin from discolorating light damage.

The present invention provides superior weatherability and protection from light induced discoloration to composite substrates as compared to prior art techniques.

SUMMARY OF THE INVENTION

Accordingly, the invention relates to a method of protecting natural composites against light-induced degradation by the steps comprising treating cellulosic or wood based fillers with an impregnating composition wherein the impregnating composition comprises a) water or water/organic solvent and b) a sterically hindered amine which is selected from at least one of the compounds of formulae (I) and (II)

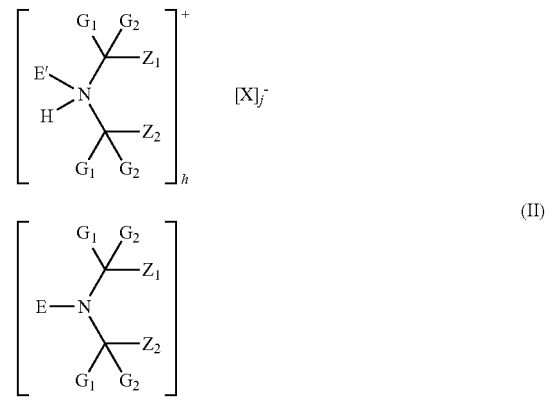

wherein $G_1$ and $G_2$ are independently alkyl of 1 to 4 carbon atoms or are together pentamethylene; $Z_1$ and $Z_2$ are each methyl, or $Z_1$ and $Z_2$ together form an unsubstituted linking moiety or a linking moiety substituted by one or more groups selected from an ester, ether, hydroxy, oxo, cyanohydrin, amide, amino, carboxy or an urethane group;

E is oxyl, hydroxyl, hydrogen or methyl;

E' is hydroxyl, hydrogen or methyl;

X is an inorganic or organic acid; and, wherein the total charge of h cations is equal to the total charge of j anions;

drying the impregnated fillers, and blending the impregnated filler with a polymer to form the natural composite.

A natural composite wherein the natural composite is formed as above or the cellulosic or wood derived fillers impregnated with the said hindered amines above are also encompassed by the present invention.

Sterically hindered amines for the purposes of the invention encompass structures of formulae (I) and (II) above. For example, when E or E' is an hydroxyl or oxy so technically the formulae (I) and (II) are not amines. But for simplicity the inventors will use the term hindered amine throughout with the understanding, that structures encompassed by formulae (I) and (II) are what is meant.

DETAILED DESCRIPTION OF THE INVENTION

X is for example phosphate, phosphonate, carbonate, bicarbonate, nitrate, chloride, bromide, bisulfite, sulfite, bisulfate, sulfate, borate, formate, acetate, benzoate, citrate, oxalate, tartrate, acrylate, polyacrylate, fumarate, maleate, itaconate, glycolate, gluconate, malate, mandelate, tiglate, ascorbate, polymethacrylate, a carboxylate of nitrilotriacetic acid, a carboxlylate of hydroxyethylethylenediaminetriacetic acid, a carboxylate of ethylenediaminetetraacetic acid, a carboxylate of diethylenetriaminepentaacetic acid, a carboxylate of diethylenediaminetetraacetic acid, a carboxylate of diethylenetriaminepentaacetic acid, alkylsulfonate, arylsulfonate, or alkyl-substituted arylsulfonate;

X is a carboxylate, especially a carboxylate of a mono-, di-, tri- or tetracarboxylic acid, mainly of 1-18 carbon atoms, such as a formate, acetate, benzoate, citrate, or oxalate.

For example, X is chloride, bisulfate, sulfate, phosphate, nitrate, ascorbate, formate, acetate, benzoate, oxalate, citrate, a carboxylate of ethylenediaminetetraacetic acid or of diethylenetriaminepentaacetic acid or polyacrylate.

For instance, X is chloride, bisulfate, ascorbate, or citrate.

Preferably, Z1 and Z2 as a linking moiety are a chain of 2 or 3 carbon atoms or 1 or 2 carbon atoms and a nitrogen or oxygen atom forming together with the remaining structure in formula (I) or formula (II) a saturated unsubstituted 5- or 6-membered heterocyclic ring or a 5- or 6-membered heterocyclic ring substituted by one or more groups selected from an ester, ether, hydroxy, oxo, cyanohydrin, amide, amino, carboxy or an urethane group. The substituents in Z1 and Z2 themselves may contain hindered amine moieties. For example, the compounds of the formulae (I) or (II) contain 1-4 hindered amine or hindered ammonium groups. For instance, the compounds of formulae (I) or (II) contain 1 or 2 hindered amine or hindered ammonium moieties.

Most preferably, Z1 and Z2 as a linking moiety are a chain of 2 or 3 carbon atoms or 1 or 2 carbon atoms and a nitrogen or oxygen atom forming together with the remaining structure in formula (I) or formula (II) a saturated unsubstituted 5- or 6-membered heterocyclic ring or a 5- or 6-membered heterocyclic ring substituted by one or more groups selected from an ester, ether, hydroxy, oxo, cyanohydrin, amide, amino, carboxy or an urethane group.

The total charge for the salt is neutral. For example, the total number of j cations is equal to the total number of h anions. It is also possible that the total number of j cations is not equal to the total number of h anions but the total charges represented by the j cations are equal to the total charges represented by the h anions.

Preferably the hindered amine b) component is a sterically hindered amine which is selected from the compounds of formulae A to EE and A* to EE* and III to IIIc

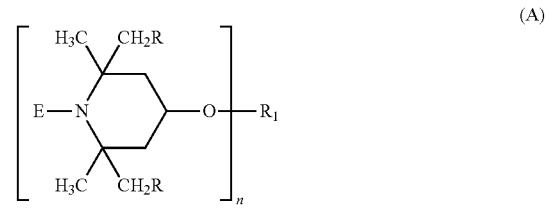

(A)

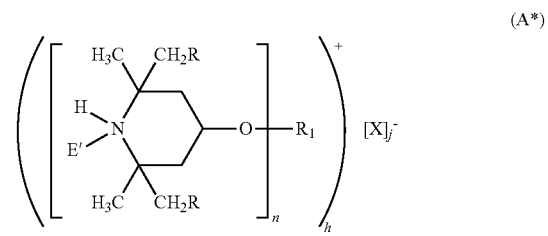

(A*)

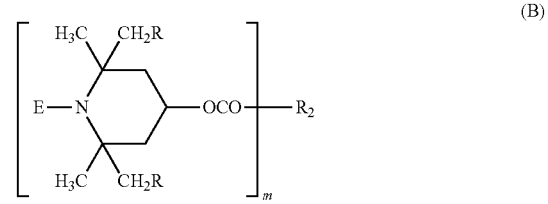

(B)

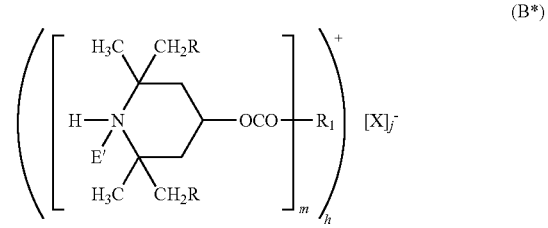

(B*)

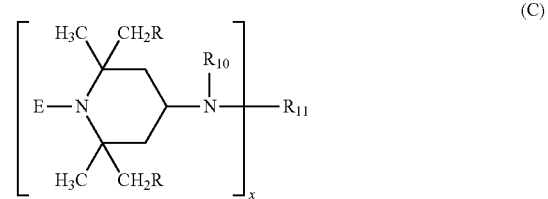

(C)

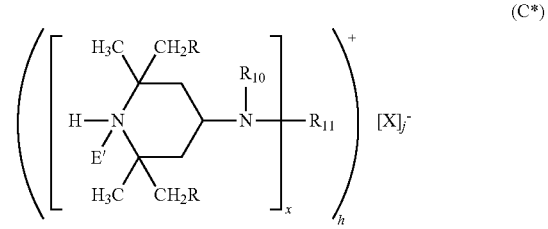

(C*)

-continued
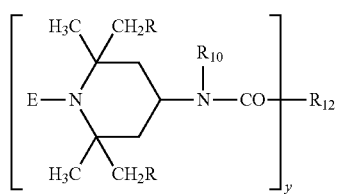
(D)
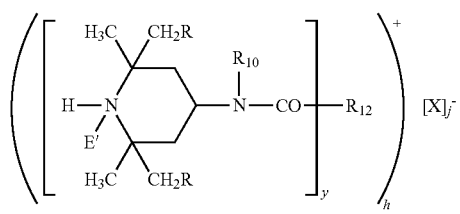
(D*)
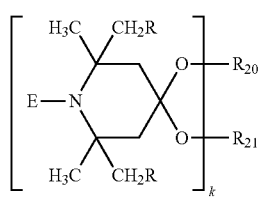
(E)
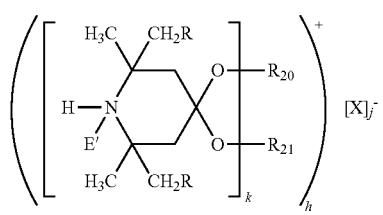
(E*)
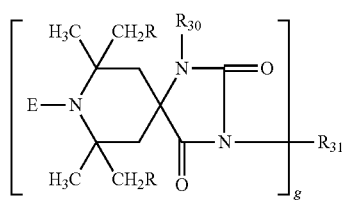
(F)
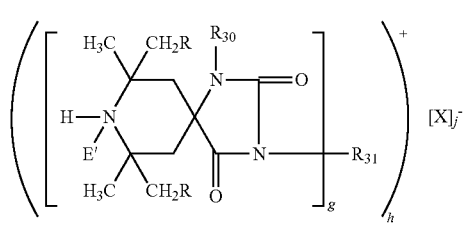
(F*)
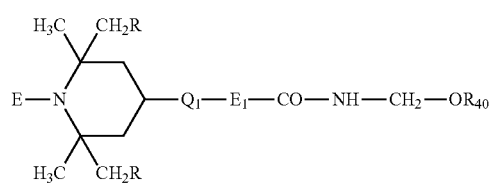
(G)
-continued
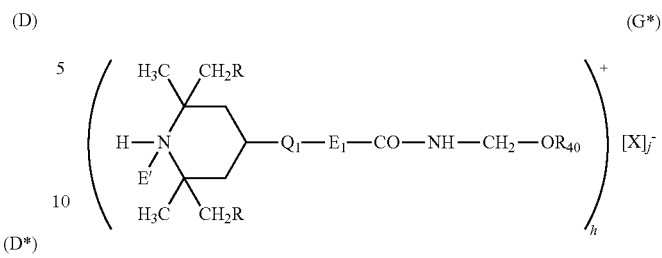
(G*)
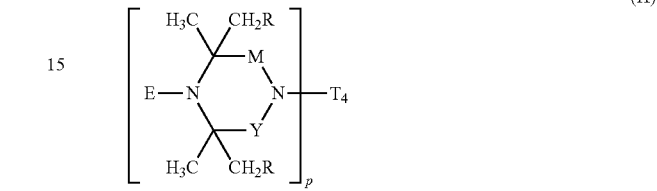
(H)
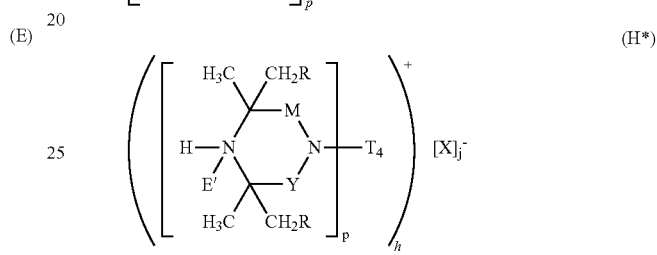
(H*)
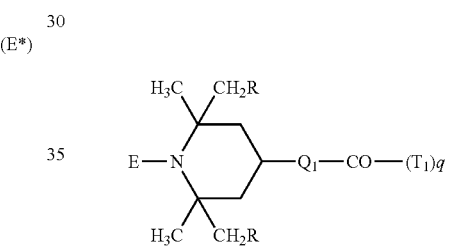
(I)
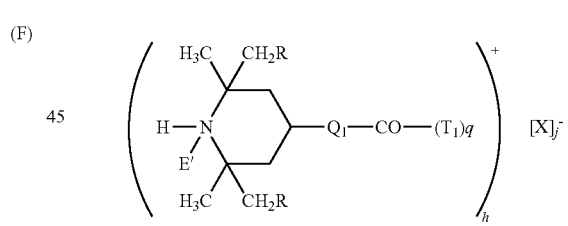
(I*)
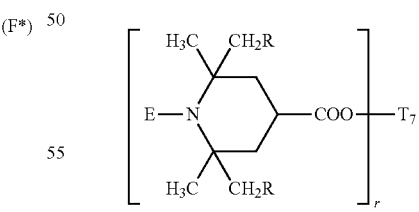
(J)
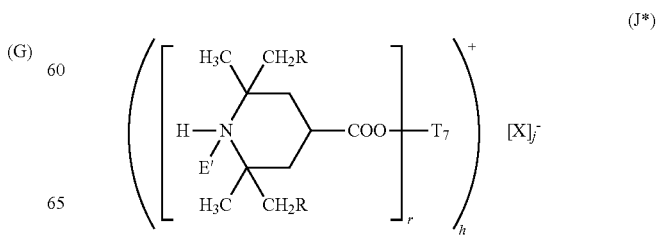
(J*)

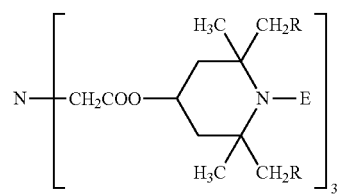 (K)
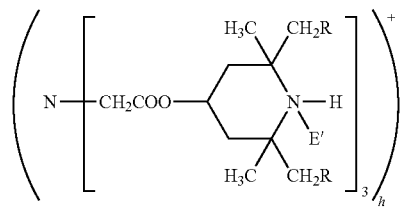 (K*)
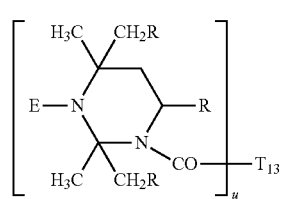 (L)
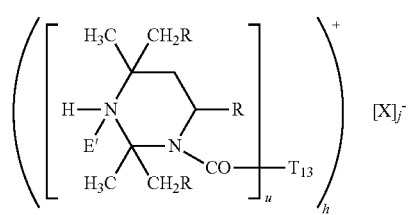 (L*)
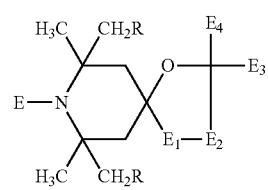 (M)
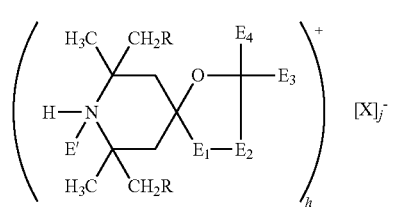 (M*)
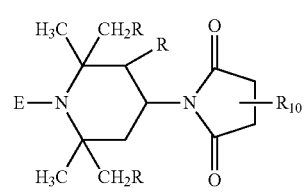 (O)
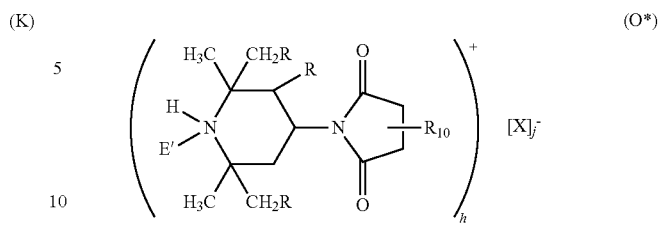 (O*)
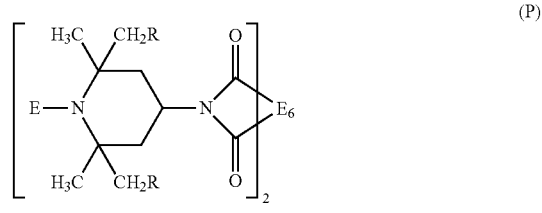 (P)
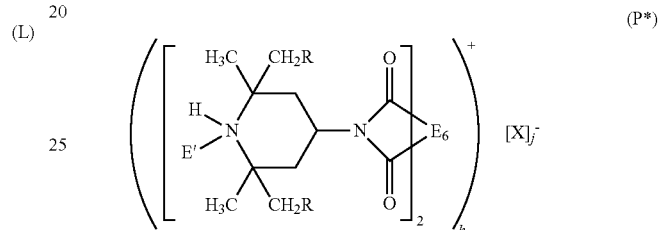 (P*)
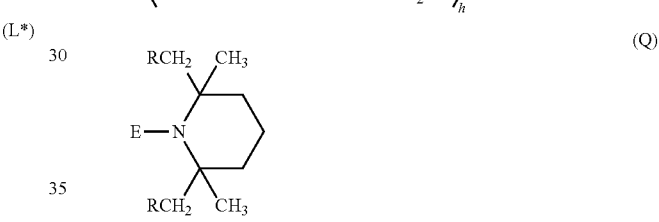 (Q)
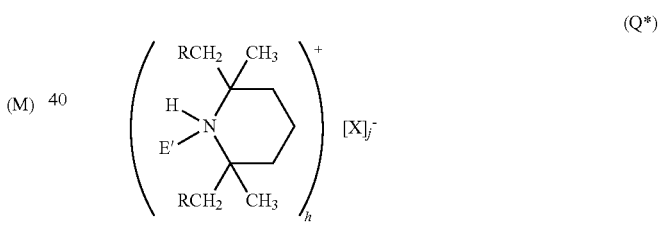 (Q*)
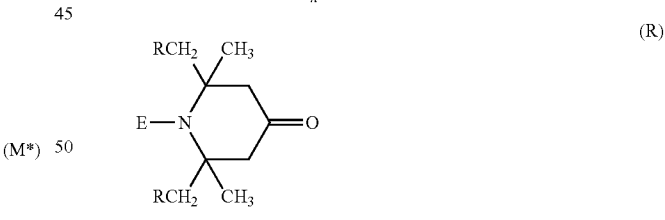 (R)
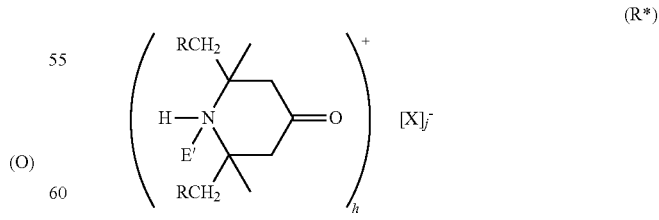 (R*)
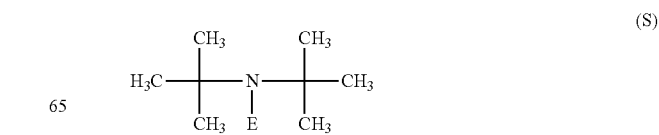 (S)

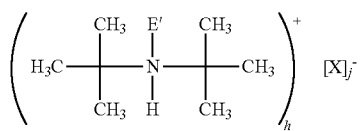 (S*)
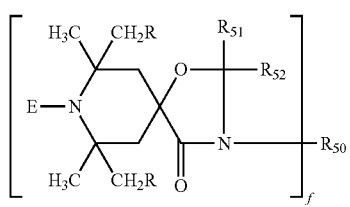 (T)
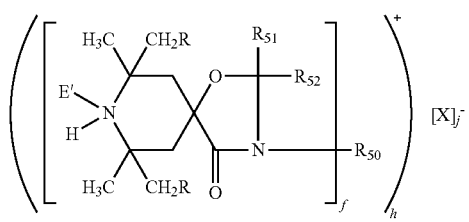 (T*)
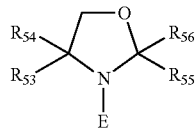 (U)
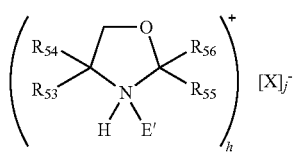 (U*)
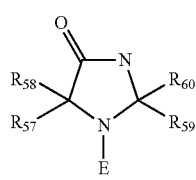 (V)
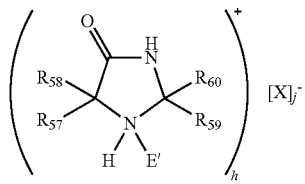 (V*)
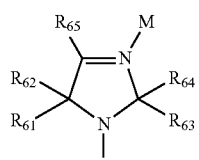 (W)
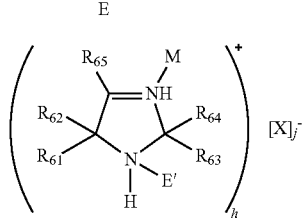 (W*)
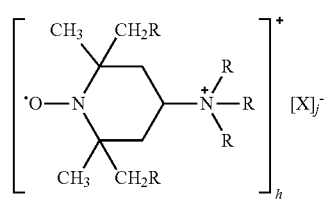 (X)
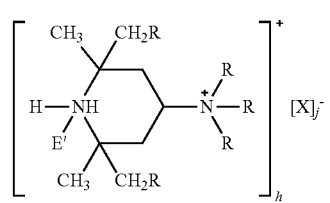 (X*)
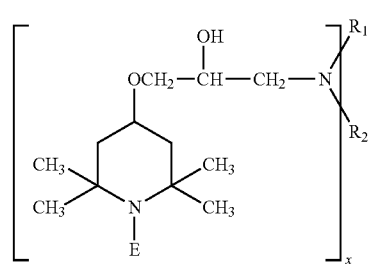 (Y)
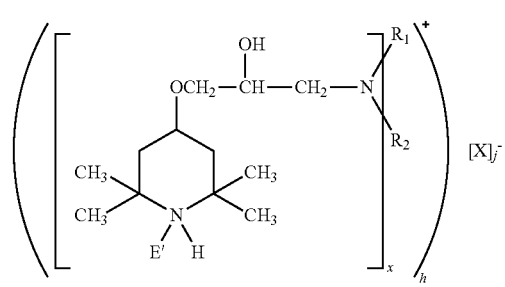 (Y*)
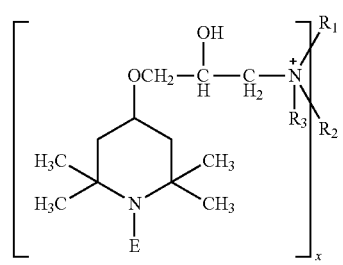 (Z)
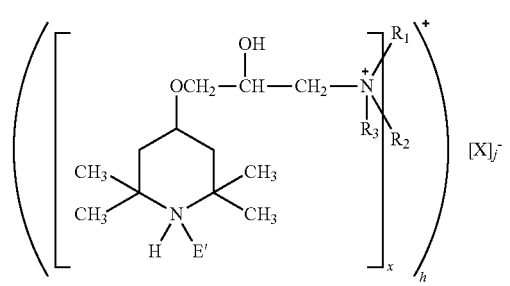 (Z*)

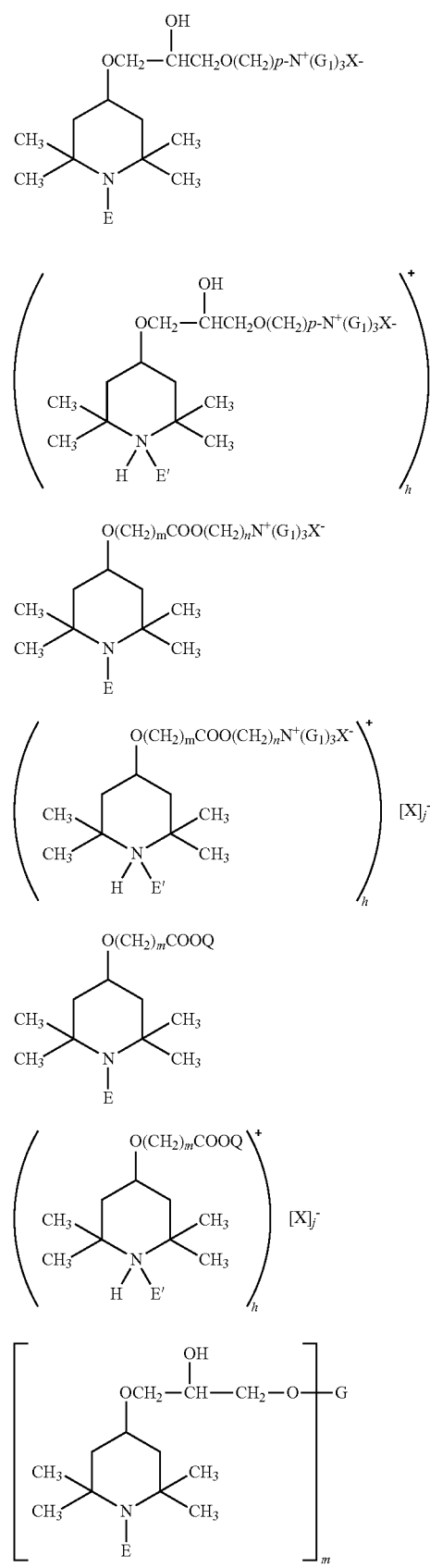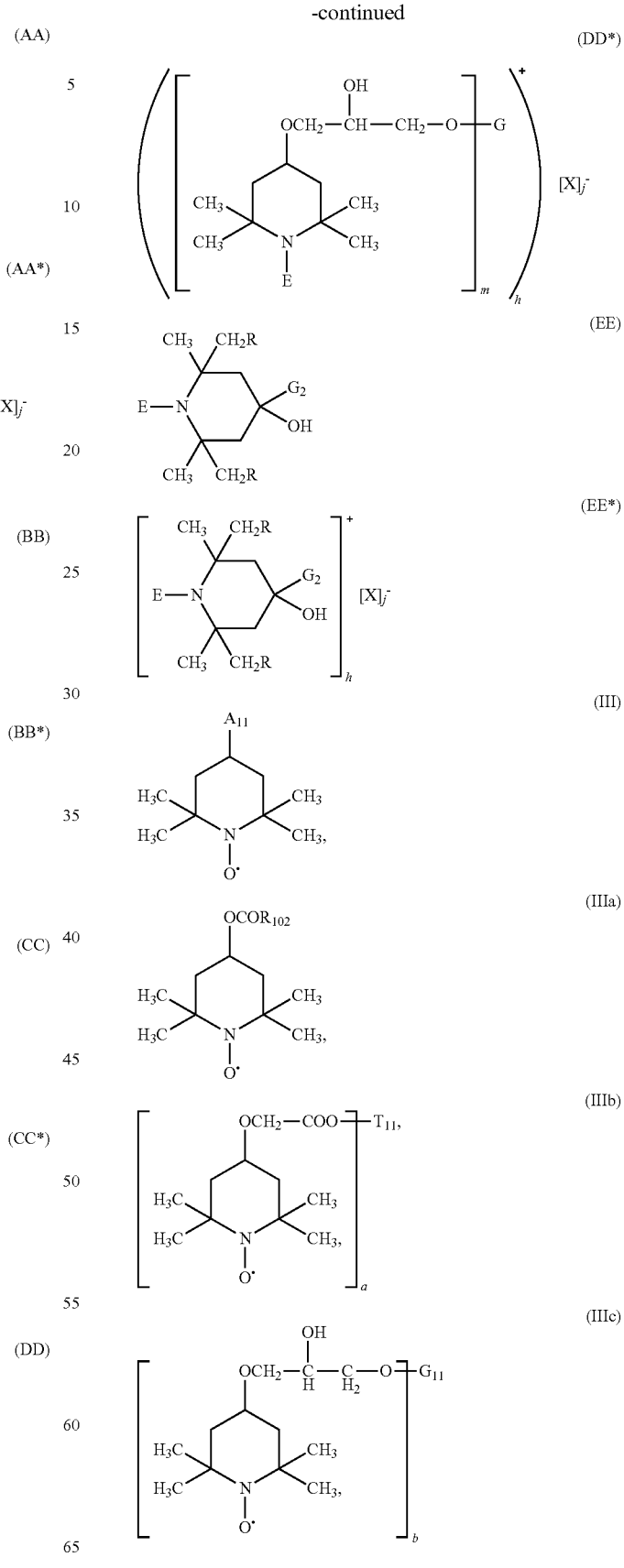

wherein
E is oxyl, hydroxyl, hydrogen or methyl
E' is hydroxyl, hydrogen or methyl,
R is hydrogen or methyl, in formula A and A*,
n is 1 or 2,
when n is 1,
$R_1$ is hydrogen, alkyl of 1 to 18 carbon atoms, alkenyl of 2-18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n M^{n+}$ where n is 1-3 and M is a metal ion from the 1st, 2nd or 3rd group of the periodic table or is Zn, Cu, Ni or Co, or M is a group $N^{n+}(R_2)_4$ where $R_2$ is alkyl of 1 to 8 carbon atoms or benzyl,
when n is 2,
$R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula B and B*,
m is 1 to 4,
when m is 1,
$R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —$CH_2(OCH_2CH_2)_n OCH_3$ where n is 1 to 12, or
$R_2$ is cycloalkyl of 5 to 12 carbon atoms, aryl of 6 to 12 carbon atoms, or said aryl substituted by one to four alkyl groups of 1 to 4 carbon atoms, or
$R_2$ is —$NHR_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or
$R_2$ is —$N(R_3)_2$ where $R_3$ is as defined above,
when m is 2,
$R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —$CH_2(OCH_2CH_2)_n OCH_2$— where n is 1 to 12, or
$R_2$ is cycloalkylene of 5 to 12 carbon atoms, aralkylene of 7 to 15 carbon atoms or arylene of 6 to 12 carbon atoms, or
$R_2$ is —$NHR_4 NH$— where $R_4$ is alkylene of 2 to 18 carbon atoms, cycloalkylene of 5 to 12 carbon atoms, aralkylene of 8 to 15 carbon atoms or arylene of 6 to 12 carbon atoms, or
$R_2$ is —$N(R_3)R_4 N(R_3)$— where $R_3$ and $R_4$ are as defined above, or
$R_2$ is —CO— or —NH—CO—NH—,
when m is 3,
$R_2$ is alkanetriyl of 3 to 8 carbon atoms or benzenetriyl, or
when m is 4,
$R_2$ is alkanetetrayl of 5 to 8 carbon atoms or benzenetetrayl, in formula C and C*,
$R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl,
x is 1 or 2,
when x is 1,
$R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —$(COO^-)_n M^{n+}$ where n is 1-3 and M is a metal ion from the 1st, 2nd or 3rd group of the periodic table or is Zn, Cu, Ni or Co, or M is a group $N^{n+}(R_2)_4$ where $R_2$ is hydrogen, alkyl of 1 to 8 carbon atoms or benzyl, or
when x is 2,
$R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups, in formula D and D*,
$R_{10}$ is as defined above,
y is 1 to 4, and
$R_{12}$ is defined as $R_2$ above, in formula E and E*,
k is 1 or 2,
when k is 1,
$R_{20}$ and $R_{21}$ are independently alkyl of 1 to 12 carbon atoms, alkenyl of 2 to 12 carbon atoms or aralkyl of 7 to 15 carbon atoms, or $R_{20}$ is also hydrogen, or
$R_{20}$ and $R_{21}$ together are alkylene of 2 to 8 carbon atoms or said alkylene substituted by hydroxyl, or are acyloxyalkylene of 4 to 22 carbon atoms, or
when k is 2,
$R_{20}$ and $R_{21}$ are together (—$CH_2)_2 C(CH_2$—$)_2$, in formula F and F*,
$R_{30}$ is hydrogen, alkyl of 1 to 18 carbon atoms, benzyl, glycidyl, or alkoxyalkyl of 2 to 6 carbon atoms,
g is 1 or 2,
when g is 1, $R_{31}$ is defined as $R_1$ above when n is 1,
when g is 2, $R_{31}$ is defined as $R_1$ above when n is 2, in formula G and G*,
$Q_1$ is —$NR_{41}$— or —O—,
$E_1$ is alkylene of 1 to 3 carbon atoms, or $E_1$ is —$CH_2$—$CH(R_{42})$—O— where $R_{42}$ is hydrogen, methyl or phenyl, or $E_1$ is —$(CH_2)_3$—NH— or $E_1$ is a direct bond,
$R_{40}$ is hydrogen or alkyl of 1 to 18 carbon atoms,
$R_{41}$ is hydrogen, alkyl of 1 to 18 carbon atoms, cycloalkyl of 5 to 12 carbon atoms, aralkyl of 7 to 15 carbon atoms, aryl of 6 to 10 carbon atoms, or $R_{41}$ is —$CH_2$—$CH(R_{42})$—OH where $R_{42}$ is as defined above, in formula H and H*,
p is 1 or 2,
$T_4$ is as defined for $R_{11}$ when x is 1 or 2,
M and Y are independently methylene or carbonyl, preferably M is methylene and Y is carbonyl, in formula I and I*, this formula denotes a recurring structural unit of a polymer where $T_1$ is ethylene or 1,2-propylene or is the repeating structural unit derived from an alpha-olefin copolymer with an alkyl acrylate or methacrylate, and where q is 2 to 100, $Q_1$ is —N($R_{41}$)— or —O— where $R_{41}$ is as defined above, in formula J and J*, r is 1 or 2, $T_7$ is as defined for $R_1$ when n is 1 or 2 in formula A, in formula L and L*, u is 1 or 2, $T_{13}$ is as defined for $R_1$ when n is 1 or 2 in formula A, with the proviso that $T_{13}$ is not hydrogen when u is 1, in formula M and M*, $E_1$ and $E_2$, being different, each are —CO— or —N($E_5$)- where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, preferably methyl, in formula N and N*, $R_1$ is as defined for $R_1$ in formula A when n is 1, $G_3$ is a direct bond, alkylene of 1 to 12 carbon atoms, phenylene or —NH-$G_1$-NH— where $G_1$ is alkylene of 1 to 12 carbon atoms, in formula O and O*, $R_{10}$ is as defined for $R_{10}$ in formula C, in formula P and P*, $E_6$ is an aliphatic or aromatic tetravalent radical, preferably neopentanetetrayl or benzenetetrayl, in formula T and T*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C when x is 1, or $R_{50}$ is —(CH$_2$)$_n$COOR$_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group —N(R$_{55}$)$_4$ where $R_{55}$ is hydrogen, alkyl of 1 to 12 carbon atoms or benzyl, when f is 2, $R_{50}$ is as defined for $R_{11}$ in formula C when x is 2, in formula U and U*, $R_{53}$, $R_{54}$, $R_{55}$ and $R_{56}$ are independently alkyl of 1 to 4 carbon atoms or are together pentamethylene.

in formula V and V*, $R_{57}$, $R_{58}$, $R_{59}$ and $R_{60}$ are independently alkyl of 1 to 4 carbon atoms or are together pentamethylene.

in formula W and W*, $R_{61}$, $R_{62}$, $R_{63}$ and $R_{64}$ are independently alkyl of 1 to 4 carbon atoms or are together pentamethylene, $R_{65}$ is alkyl of 1 to 5 carbon atoms, M is hydrogen or oxygen, wherein in formulas X to CC and X* to CC* n is 2 to 3, $G_1$ is hydrogen, methyl, ethyl, butyl or benzyl, m is 1 to 4, x is 1 to 4, when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethyl, pentamethylene, hexamethylene or 3-oxapentamethylene, when x is 2, $R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_2$ is —(CH$_2$)$_k$O[(CH$_2$)$_k$O]$_h$(CH$_2$)$_k$— where k is 2 to 4 and h is 1 to 40, or $R_1$ and $R_2$ together with the two N atoms to which they are attached are piperazin-1,4-diyl, when x is 3, $R_1$ is hydrogen, $R_2$ is alkylene of 4 to 8 carbon atoms interrupted by one nitrogen atom, when x is 4, $R_1$ is hydrogen, $R_2$ is alkylene of 6 to 12 carbon atoms interrupted by two nitrogen atoms, $R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, p is 2 or 3, and Q is an alkali metal salt, ammonium or N$^+$(G$_1$)$_4$, and in formula DD and DD* m is 2 or 3, when m is 2, G is —(CH$_2$CHR—O)$_r$CH$_2$CHR—, where r is 0 to 3, and R is hydrogen or methyl, and when m is 3, G is glyceryl, in formula EE and EE*

$G_2$ is —CN, —CONH$_2$ or —COOG$_3$ where $G_3$ is hydrogen, alkyl of 1 to 18 carbon atoms or phenyl, X is an inorganic or organic anion, where the total charge of cations h is equal to the total charge of anions j; and wherein in formulas III to IIIc $A_{11}$ is OR$_{101}$ or NR$_{111}$R$_{112}$ $R_{101}$ is alkenyl of 2 to 4 carbon atoms, propargyl, glycidyl, alkyl of 2 to 6 carbon atoms interrupted by one or two oxygen atoms, substituted by one to three hydroxyl groups or both interrupted by said oxygen atoms and substituted by said hydroxyl groups, or $R_{101}$ is alkyl of 1 to 4 carbon atoms substituted by carboxy or by the alkali metal, ammonium or $C_1$-$C_4$alkylammonium salts thereof; or $R_{101}$ is alkyl substituted by —COOE$_{10}$ where $E_{10}$ is methyl or ethyl, $R_{102}$ is alkyl of 3 to 5 carbon atoms interrupted by —COO— or by —CO, or $R_{102}$ is —CH$_2$(OCH$_2$CH$_2$)$_c$OCH$_3$ where c is 1 to 4; or $R_{102}$ is —NHR$_{103}$ where $R_{103}$ is alkyl of 1 to 4 carbon atoms, a is 2 to 4, when a is 2, $T_{11}$ is —(CH$_2$CHR$_{100}$—O)$_d$CH$_2$CHR$_{100}$—, where d is 0 or 1, and $R_{100}$ is hydrogen or methyl, when a is 3, $T_{11}$ is glyceryl, when a is 4, $T_{11}$ is neopentanetetrayl, b is 2 or 3, when b is 2, $G_{11}$ is —(CH$_2$CHR$_{100}$—O)$_e$CH$_2$CHR$_{100}$—, where e is 0 to 3, and $R_{100}$ is hydrogen or methyl, and when b is 3, $G_{11}$ is glyceryl;

$R_{111}$ is hydrogen, alkyl of 1 to 4 carbon atoms, or said alkyl substituted by one or two hydroxyl, interrupted by one or two oxygen atoms, or both substituted by one hydroxyl and interrupted by one or two oxygen atoms, $R_{112}$ is —CO—R$_{113}$ where $R_{113}$ has the same meaning as $R_{111}$, or $R_{113}$ is —NHR$_{114}$ wherein $R_{114}$ is alkyl of 1 to 4 carbon atoms, said alkyl substituted by one or two hydroxyl, substituted by alkoxy of 1 to 2 carbon atoms, or said alkyl both substituted by one hydroxyl and by one alkoxy of 1 to 2 carbon atoms, or $R_{111}$ and $R_{112}$ together are —CO—CH$_2$CH$_2$—CO—, —CO—CH=CH—CO— or —(CH$_2$)$_6$—CO—; and with the proviso that, when $R_{113}$ is alkyl of 1 to 4 carbon atoms, $R_{111}$ is not hydrogen.

More preferably the compound of component (b) is selected from the compounds of formulas A, A*, B, B*, C, C*, D, D*, Q, Q*, R, R*, S or S*, X, X*, Y, Y*, Z and Z* where E is hydrogen, oxyl or hydroxyl, and R is hydrogen,

E' is hydrogen, hydroxyl or methyl, in formula A and A* n is 1 or 2, when n is 1, $R_1$ is hydrogen, alkyl of 1 to 6 carbon atoms, alkenyl of 2-6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or $R_1$ is alkyl of 1 to 4 carbon atoms substituted by a carboxy group or by —COOZ where Z is hydrogen or alkyl of 1 to 4 carbon atoms, when n is 2, $R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups, in formula B and B* m is 1 or 2 when m is 1, $R_2$ is alkyl of 1 to 4 carbon atoms or $R_2$ is CH$_2$(OCH$_2$CH$_2$)$_n$OCH$_3$ where n is 1 to 12, or $R_2$ is phenyl, or said phenyl substituted by one to three methyl groups, or $R_2$ is —NHR$_3$ where $R_3$ is alkyl of 1 to 4 carbon atoms or phenyl, or said phenyl substituted by one or two methyl groups, when m is 2, R is alkylene of 1 to 8 carbon atoms, alkenylene of 4 to 8 carbon atoms, or $R_2$ is —CH$_2$(OCH$_2$CH$_2$)$_n$OCH$_2$— where n is 1 to 12, $R_2$ is NHR$_4$NH where $R_4$ is of 2 to 6 carbon atoms, aralkylene of 8 to 15 carbon atoms or arylene of 6 to 12 carbon atoms, or $R_2$ is —CO— or —NHCONH, in formula C and C*, $R_{10}$ is hydrogen or, alkanoyl of 1 to 3 carbon atoms, x is 1 or 2, when x is 1, $R_{11}$ is hydrogen, alkyl of 1 to 6 carbon atoms or glycidyl, or $R_{11}$ is alkyl of 1 to 4 carbon atoms substituted by a carboxy group or by COOZ where Z is hydrogen or alkyl of 1 to 4 carbon atoms, when x is 2, $R_{11}$ is alkylene of 1 to 6 carbon atoms, in formula D and D*, $R_{10}$ is hydrogen, y is 1 or 2, $R_{12}$ is defined as $R_2$ above, in formula Y, Y*, Z and Z*, x is 1 or 2, when x is 1, $R_1$ and $R_2$ are independently alkyl of 1 to 4 carbon atoms, or $R_1$ and $R_2$ are together tetramethylene, or pentamethylene, $R_2$ is hydrogen or alkyl of 1 to 4 carbon atoms, said alkyl group substituted by a hydroxyl group, when x is 2, $R_1$ is hydrogen, alkyl of 1 to 4 carbon atoms, said alkyl substituted by a hydroxyl group, $R_2$ is alkylene of 2 to 6 carbon atoms, $R_3$ is as defined above.

More preferably the compound of component (b) is selected from the compounds of formulas A, A*, B, B*, C, C*, D, D*, Q, Q*, R and R* where E is hydrogen, oxyl, hydroxyl or methyl,

E' is hydrogen, hydroxyl or methyl,

R is hydrogen, in formula A and A*, h is 1,

R₁ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or R₁ is alkyl of 1 to 4 carbon atoms substituted by —COOZ where Z is hydrogen or alkyl of 1 to 4 carbon atoms, in formula B and B*, m is 1 or 2, $R_2$ is alkyl of 1 to 4 carbon atoms or $R_2$ is $CH_2(OCH_2CH_2)_nOCH_3$ where n is 1 to 4, when m is 2, R is alkylene of 1 to 8 carbon atoms, with the proviso that bis(1,2,2,6,6-pentamethyl-4-piperidinyl)sebacate and methyl(1,2,2,6,6-pentamethyl-4-piperidinyl)sebacate are excluded, in formula C and C*, $R_{10}$ is hydrogen or alkanoyl of 1 or 2 carbon atoms, x is 1 or 2, when x is 1, $R_{11}$ is hydrogen, alkyl of 1 to 4 carbon atoms or glycidyl, or $R_{11}$ is alkyl of 1 to 4 carbon atoms substituted by COOZ where Z is hydrogen or alkyl of 1 to 4 carbon atoms, when x is 2, $R_{11}$ is alkylene of 1 to 6 carbon atoms, in formula D and D*, $R_{10}$ is hydrogen, y is 1 or 2, $R_{12}$ is defined as $R_2$ above.

While not wishing to be bound by theory, the higher water solubility of the hindered amine the more likely it is to penetrate the lignin. Thus salts (those structures designated with an *) of the above are preferred or low molecular weight hindered amines. By low molecular weight it is meant weights below 500, for example below 450 or below 350. By higher water solubility it is meant that the hindered amine is at least about 5.0% soluble in water at room temperature.

More particularly, the hindered amine compound is bis(1-oxyl-2,2,6,6-tetramethylpiperidin-4-yl)sebacate;
bis(1-hydroxy-2,2-6-6-tetramethylpiperidin-4-yl)sebacate;
bis(1,2,2,6,6-pentamethylpiperidinium-4-yl)sebacate citrate;
bis(2,2,6,6-tetramethylpiperidinium-4-yl)sebacate citrate;
1-hydroxy-2,2,6,6-tetramethyl-4-acetoxypiperidinium citrate;
1,2,2,6,6-pentamethyl-4-acetoxypiperidinium citrate;
2,2,6,6-pentamethyl-4-acetoxypiperidinium citrate
1-oxyl-2,2,6,6-tetramethyl-4-acetamidopiperidine;
1-hydroxy-2,2,6,6-tetramethyl-4-acetamidopiperidine;
1-hydroxy-2,2,6,6-tetramethyl-4-acetamidopiperidinium bisulfate;
1,2,2,6,6-pentamethyl-4-acetamidopiperidinium bisulfate;
2,2,6,6-tetramethyl-4-acetamidopiperidinium bisulfate;
1-oxyl-2,2,6,6-tetramethyl-4-oxo-piperidine;
1-hydroxy-2,2,6,6-tetramethyl-4-oxo-piperidine;
1-hydroxy-2,2,6,6-tetramethyl-4-oxo-piperidinium acetate;
1,2,2,6,6-pentamethyl-4-oxo-piperidinium acetate;
2,2,6,6-tetramethyl-4-oxo-piperidinium acetate;
1-oxyl-2,2,6,6-tetramethyl-4-methoxy-piperidine;
1-hydroxy-2,2,6,6-tetramethyl-4-methoxy-piperidine;
1-hydroxy-2,2,6,6-tetramethyl-4-methoxy-piperidinium acetate;
1,2,2,6,6-pentamethyl-4-methoxy-piperidinium acetate;
2,2,6,6-tetramethyl-4-methoxy-piperidinium acetate;
1-oxyl-2,2,6,6-tetramethyl-4-acetoxypiperidine;
1-hydroxy-2,2,6,6-tetramethyl-4-acetoxypiperidine;
1-oxyl-2,2,6,6-tetramethyl-4-propoxy-piperidine;
1-hydroxy-2,2,6,6-tetramethyl-4-propoxy-piperidinium acetate;
1,2,2,6,6-pentamethyl-4-propoxy-piperidinium acetate;
2,2,6,6-tetramethyl-4-propoxy-piperidinium acetate;
1-hydroxy-2,2,6,6-tetramethyl-4-propoxy-piperidine;
1-oxyl-2,2,6,6-tetramethyl-4-(2-hydroxy-4-oxapentoxy)piperidine;
1-hydroxy-2,2,6,6-tetramethyl-4-(2-hydroxy-4-oxapentoxy)piperidinium acetate;
1,2,2,6,6-pentamethyl-4-(2-hydroxy-4-oxapentoxy)piperidinium acetate;
2,2,6,6-tetramethyl-4-(2-hydroxy-4-oxapentoxy)piperidinium acetate;
1-oxyl-2,2,6,6-tetramethyl-4-hydroxypiperidine;
1-hydroxy-2,2,6,6-tetramethyl-4-hydroxypiperidine;
1-hydroxy-2,2,6,6-tetramethyl-4-hydroxypiperidinium chloride;
1,2,2,6,6-pentamethyl-4-hydroxypiperidinium chloride;
2,2,6,6-tetramethyl-4-hydroxypiperidinium chloride;
1-hydroxy-2,2,6,6-tetramethyl-4-hydroxypiperidinium acetate;
1,2,2,6,6-pentamethyl-4-hydroxypiperidinium acetate;
2,2,6,6-tetramethyl-4-hydroxypiperidinium acetate;
1-hydroxy-2,2,6,6-tetramethyl-4-hydroxypiperidinium bisulfate;
1,2,2,6,6-pentamethyl-4-hydroxypiperidinium bisulfate;
2,2,6,6-tetramethyl-4-hydroxypiperidinium bisulfate;
1-hydroxy-2,2,6,6-tetramethyl-4-hydroxypiperidinium citrate;
1,2,2,6,6-pentamethyl-4-hydroxypiperidinium citrate;
2,2,6,6-tetramethyl-4-hydroxypiperidinium citrate;
bis(1-hydroxy-2,2,6,6-tetramethyl-4-hydroxypiperidinium) citrate;
bis(1,2,2,6,6-pentamethyl-4-hydroxypiperidinium)citrate;
bis(2,2,6,6-tetramethyl-4-hydroxypiperidinium)citrate;
tris(1-hydroxy-2,2,6,6-tetramethyl-4-hydroxypiperidinium) citrate;
tris(1,2,2,6,6-pentamethyl-4-hydroxypiperidinium)citrate;
tris(2,2,6,6-tetramethyl-4-hydroxypiperidinium)citrate;
tetra(1-hydroxy-2,2,6,6-tetramethyl-4-hydroxypiperidinium)ethylenediaminetetraacetate;
tetra(1,2,2,6,6-pentamethyl-4-hydroxypiperidinium)ethylenediaminetetraacetate;
tetra(2,2,6,6-tetramethyl-4-hydroxypiperidinium)ethylenediaminetetraacetate;
tetra(1-hydroxy-2,2,6,6-tetramethyl-4-acetamidopiperidinium)ethylenediaminetetraacetate;
tetra(1,2,2,6,6-pentamethyl-4-acetamidopiperidinium)ethylenediaminetetraacetate;
tetra(2,2,6,6-tetramethyl-4-acetamidopiperidinium)ethylenediaminetetraacetate;
tetra(1-hydroxy-2,2,6,6-tetramethyl-4-oxopiperidinium)ethylenediaminetetraacetate;
tetra(1,2,2,6,6-pentamethyl-4-oxopiperidinium)ethylenediaminetetraacetate;
tetra(2,2,6,6-tetramethyl-4-oxopiperidinium)ethylenediaminetetraacetate;
penta(1-hydroxy-2,2,6,6-tetramethyl-4-hydroxypiperidinium)diethylenetriaminepentaacetate;
penta(1,2,2,6,6-pentamethyl-4-hydroxypiperidinium)diethylenetriaminepentaacetate;
penta(2,2,6,6-tetramethyl-4-hydroxypiperidinium)diethylenetriaminepentaacetate;

penta(1-hydroxy-2,2,6,6-tetramethyl-4-acetamidopiperidinium)diethylenetriaminepentaacetate;
penta(1,2,2,6,6-pentamethyl-4-acetamidopiperidinium)diethylenetriaminepentaacetate;
penta(2,2,6,6-tetramethyl-4-acetamidopiperidinium)diethylenetriaminepentaacetate;
penta(1-hydroxy-2,2,6,6-tetramethyl-4-oxopiperidinium)diethylenetriaminepentaacetate;
penta(1,2,2,6,6-pentamethyl-4-oxopiperidinium)diethylenetriaminepentaacetate;
penta(2,2,6,6-tetramethyl-4-oxopiperidinium)diethylenetriaminepentaacetate;
tri(1-hydroxy-2,2,6,6-tetramethyl-4-hydroxypiperidinium) nitritotriacetate;
tri(1,2,2,6,6-pentamethyl-4-hydroxypiperidinium)nitrilotriacetate;
tri(2,2,6,6-tetramethyl-4-hydroxypiperidinium)nitrilotriacetate;
tri(1-hydroxy-2,2,6,6-tetramethyl-4-acetamidopiperidinium)nitrilotriacetate;
tri(1,2,2,6,6-pentamethyl-4-acetamidopiperidinium)nitrilotriacetate;
tri(2,2,6,6-tetramethyl-4-acetamidopiperidinium)nitrilotriacetate;
tri(1-hydroxy-2,2,6,6-tetramethyl-4-oxopiperidinium)nitrilotriacetate;
tri(1,2,2,6,6-pentamethyl-4-oxopiperidinium)nitrilotriacetate;
tri(2,2,6,6-tetramethyl-4-oxopiperidinium)nitrilotriacetate;
penta(1-hydroxy-2,2,6,6-tetramethyl-4-hydroxypiperidinium)diethylenetriaminepentamethylenephosphonate;
penta(1,2,2,6,6-pentamethyl-4-hydroxypiperidinium)diethylenetriaminepentamethylenephosphonate;
penta(2,2,6,6-tetramethyl-4-hydroxypiperidinium)diethylenetriaminepentamethylenephosphonate;
penta(1-hydroxy-2,2,6,6-tetramethyl-4-acetamidopiperidinium)diethylenetriaminepentamethylenephosphonate;
penta(1,2,2,6,6-pentamethyl-4-acetamidopiperidinium)diethylenetriaminepentamethylenephosphonate;
penta(2,2,6,6-tetramethyl-4-acetamidopiperidinium)diethylenetriaminepentamethylenephosphonate;
penta(1-hydroxy-2,2,6,6-tetramethyl-4-oxopiperidinium)diethylenetriaminepentamethylenephosphonate;
penta(1,2,2,6,6-pentamethyl-4-oxopiperidinium)diethylenetriaminepentamethylenephosphonate;
penta(2,2,6,6-tetramethyl-4-oxopiperidinium)diethylenetriaminepentamethylenephosphonate;
4-hydroxy-tetramethylpiperdine;
1-hydroxy-2,2,6,6-tetramethyl-piperidinium citrate;
1,2,2,6,6-pentamethyl-piperidinium citrate;
2,2,6,6-tetramethyl-piperidinium citrate;
1-hydroxy-2,2,6,6-tetramethylpiperidine;
1-hydroxy-2,2,6,6-tetramethylpiperidinium chloride;
1,2,2,6,6-pentamethylpiperidinium chloride;
2,2,6,6-tetramethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
2,2,6,6-tetramethyl-4-oxo-piperidine;
1,2,2,6,6-pentamethylpiperidine;
1,2,2,6,6-pentamethyl-4-oxo-piperidine;
or 1,2,2,6,6-pentamethylpiperidine-4-hydroxy-piperidine.
Most especially, the hindered amine compound is 1-oxyl-2,2,6,6-tetramethyl-4-hydroxypiperidine;
1-hydroxy-2,2,6,6-tetramethyl-4-hydroxypiperidine;
1-hydroxy-2,2,6,6-tetramethyl-4-hydroxypiperidinium chloride;
1,2,2,6,6-pentamethyl-4-hydroxypiperidinium chloride;
2,2,6,6-tetramethyl-4-hydroxypiperidinium chloride;
1-hydroxy-2,2,6,6-tetramethyl-4-hydroxypiperidinium acetate;
1,2,2,6,6-pentamethyl-4-hydroxypiperidinium acetate;
2,2,6,6-tetramethyl-4-hydroxypiperidinium acetate;
1-hydroxy-2,2,6,6-tetramethyl-4-hydroxypiperidinium bisulfate;
1,2,2,6,6-pentamethyl-4-hydroxypiperidinium bisulfate;
2,2,6,6-tetramethyl-4-hydroxypiperidinium bisulfate;
1-hydroxy-2,2,6,6-tetramethyl-4-hydroxypiperidinium citrate;
1,2,2,6,6-pentamethyl-4-hydroxypiperidinium citrate;
2,2,6,6-tetramethyl-4-hydroxypiperidinium citrate;
bis(1-hydroxy-2,2,6,6-tetramethyl-4-hydroxypiperidinium) citrate;
bis(1,2,2,6,6-pentamethyl-4-hydroxypiperidinium)citrate;
bis(2,2,6,6-tetramethyl-4-hydroxypiperidinium)citrate;
tris(1-hydroxy-2,2,6,6-tetramethyl-4-hydroxypiperidinium) citrate;
tris(1,2,2,6,6-pentamethyl-4-hydroxypiperidinium)citrate;
tris(2,2,6,6-tetramethyl-4-hydroxypiperidinium)citrate;
tetra(1-hydroxy-2,2,6,6-tetramethyl-4-hydroxypiperidinium) ethylenediaminetetraacetate;
tetra(1,2,2,6,6-pentamethyl-4-hydroxypiperidinium)ethylenediaminetetraacetate;
tetra(2,2,6,6-tetramethyl-4-hydroxypiperidinium)ethylenediaminetetraacetate;
tetra(1-hydroxy-2,2,6,6-tetramethyl-4-acetamidopiperidinium)ethylenediaminetetraacetate;
tetra(1,2,2,6,6-pentamethyl-4-acetamidopiperidinium)ethylenediaminetetraacetate;
tetra(2,2,6,6-tetramethyl-4-acetamidopiperidinium)ethylenediaminetetraacetate;
tetra(1-hydroxy-2,2,6,6-tetramethyl-4-oxopiperidinium)ethylenediaminetetraacetate;
tetra(1,2,2,6,6-pentamethyl-4-oxopiperidinium)ethylenediaminetetraacetate;
tetra(2,2,6,6-tetramethyl-4-oxopiperidinium)ethylenediaminetetraacetate;
penta(1-hydroxy-2,2,6,6-tetramethyl-4-hydroxypiperidinium)diethylenetriaminepentaacetate;
penta(1,2,2,6,6-pentamethyl-4-hydroxypiperidinium)diethylenetriaminepentaacetate;
penta(2,2,6,6-tetramethyl-4-hydroxypiperidinium)diethylenetriaminepentaacetate;
penta(1-hydroxy-2,2,6,6-tetramethyl-4-acetamidopiperidinium)diethylenetriaminepentaacetate;
penta(1,2,2,6,6-pentamethyl-4-acetamidopiperidinium)diethylenetriaminepentaacetate;
penta(2,2,6,6-tetramethyl-4-acetamidopiperidinium)diethylenetriaminepentaacetate;
penta(1-hydroxy-2,2,6,6-tetramethyl-4-oxopiperidinium)diethylenetriaminepentaacetate;
penta(1,2,2,6,6-pentamethyl-4-oxopiperidinium)diethylenetriaminepentaacetate;
penta(2,2,6,6-tetramethyl-4-oxopiperidinium)diethylenetriaminepentaacetate;
4-hydroxy-tetramethylpiperdine;
1-hydroxy-2,2-6-6-tetramethyl-piperidinium citrate;
1-hydroxy-2,2,6,6-tetramethyl-piperidine;
1,2,2-6-6-pentamethyl-piperidinium citrate;
2,2-6-6-tetramethyl-piperidinium citrate;
1-hydroxy-2,2,6,6-tetramethylpiperidinium chloride;

1,2,2,6,6-pentamethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
1-hydroxy-2,2,6,6-tetramethylpiperidinium citrate;
1,2,2,6,6-pentamethylpiperidinium citrate;
2,2,6,6-tetramethylpiperidinium citrate;
2,2,6,6-tetramethyl-4-oxo-piperidine;
1,2,2,6,6-pentamethylpiperidine;
1,2,2,6,6-pentamethyl-4-oxo-piperidine; or
1,2,2,6,6-pentamethylpiperidine-4-hydroxy-piperidine.

Especially preferred, the hindered amine compound is
1-oxyl-2,2,6,6-tetramethyl-4-hydroxypiperidine;
1-hydroxy-2,2,6,6-tetramethyl-4-hydroxypiperidine;
1-hydroxy-2,2-6-6-tetramethyl-4-acetoxypiperidinium citrate;
1,2,2,6,6-pentamethyl-4-hydroxypiperidinium citrate;
2,2-6-6-tetramethyl-4-acetoxypiperidinium citrate;
bis(1-hydroxy-2,2,6,6-tetramethyl-4-hydroxypiperidinium) citrate;
bis(1,2,2,6,6-pentamethyl-4-hydroxypiperidinium)citrate;
bis(2,2,6,6-tetramethyl-4-hydroxypiperidinium)citrate;
tris(1-hydroxy-2,2,6,6-tetramethyl-4-hydroxypiperidinium) citrate;
tris(1,2,2,6,6-pentamethyl-4-hydroxypiperidinium)citrate;
tris(2,2,6,6-tetramethyl-4-hydroxypiperidinium)citrate;
1-hydroxy-2,2,6,6-tetramethylpiperidinium chloride;
1,2,2,6,6-pentamethylpiperidinium chloride;
2,2,6,6-tetramethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
2,2,6,6-tetramethyl-4-oxo-piperidine;
2,2,6,6-tetramethyl-4-oxo-piperidine;
1,2,2,6,6-pentamethylpiperidine;
1,2,2,6,6-pentamethylpiperidine;
1,2,2,6,6-pentamethyl-4-oxo-piperidine;
or
1,2,2,6,6-pentamethylpiperidine-4-hydroxy-piperidine.

The treated filler is blended with polymer by means of melt processing to form a melt.

The composites are preferably blended by such standard means as injection molding, compression molding, co-kneading, pultrusion, roll-milling and extrusion. These methods are used to fuse the combined product (cellulosic material or wood based material) under sufficient conditions to blend the combined product into a homogeneous mixture and a completed useable synthetic wood material component. Blending may be done in various ways such as mixing, mixing with melting or just metering all components into an extruder. The treated filler may also be formed into pellets for better metering for melt processing.

The composites may be employed as construction and building materials, for example as, decorative moldings inside or outside of a house, picture frames, furniture, porch decks, window moldings, window components, door components, roofing systems, siding, fencing and roofing shingles. They may also be employed in for example automotive application, such as interior panels, rear shelves, and spare tire covers. The composites are also suitable for infrastructure application, for example boardwalks, docks and related structures. They may also be used in consumer/industrial application, for instance as picnic tables, park benches, pallets, etc. The composites may be used to replace parts currently being produced from wood, thermoplastic or metal, or combinations thereof.

The composites are in the form of extruded or compression molded products, for example, pressed wood, particle board, chip board, wafer board, plywood, laminated materials and the like.

The water or water/solvent mixture of component a) are liquid and may form an emulsion, dispersion or suspension with component b) and may include a surfactant or stabilizers to aid in the dispersion or emulsification of component b). Suitable surfactants are known in the art and may be of cationic, anionic or non ionic type. They are commercially available and widely used in the ink and paint industry.

The component a) is a polar solvent. Preferably the solvent is water or an alcohol/water mixture. Most preferably, component a) is water.

More preferably the compounds of component b) are water-soluble. Water-soluble in the sense of the present invention means that they are at room temperature soluble at least 0.1% by weight based on the amount of water, more preferably at least 1% and most preferably at least 5%.

These natural product composites contain cellulosic or wood fillers and polymer. The cellulosic fillers may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice huls, coconut shells, peanut shells, bagass, plant fibers, hemp, bamboo or palm fiber and kenaf.

Preferably the cellulosic or wood based material is wood flour, saw dust, ground wood, wood particles, or wood fibers.

The fillers may range in size from about 30 to about 600 microns.

The composite typically includes from about 1% to about 75% by weight wood or cellulosic material, preferably about 30% to about 75%, and most preferably about 35% to about 70% based on the total weight of the composite.

The impregnating composition penetrates the surface of the cellulosic or wood based material, and should therefore be of relatively low viscosity. In the simplest case, the impregnation is a solution, suspension or dispersion of the hindered amine in water, or blends of water and solvent. The impregnation may also contain a binder and/or a penetrant conventionally used for protective wood coatings. The solution, suspension or dispersion may also optionally contain UV absorbers, compatibilizers, hydrophilic modified oils, additional stabilizers, lubricants, fire retardants and preservatives and/or biocides.

The impregnation can be applied to the wood or cellulosic fillers by conventional techniques, for example by impregnating, spreading, brushing, dipping, deluging or spraying. Also impregnating under high pressure or under vacuum is possible.

The hindered amine of compound b) may be present in the water or water/solvent as a dispersion, solution, emulsion or suspension.

The hindered amine of compound b) is present in the impregnating composition in an amount of about 0.1 to about 20 weight % based on the weight of total impregnating solution, suspension or dispersion. For example, compound b) is present at about 1 to about 6% by weight. Preferably, compound b) is present in at least 1% by weight and more preferably at least 2% by weight but usually not more than about 6% by weight.

It is preferred that dyes or pigments are not present in the impregnating composition.

The weight ratio of impregnating composition to the wood or cellulosic fillers ranges from about 0.1:10 to about 10:0.1, preferably from about 0.1:5 to about 5:0.1 and most preferably from about 0.1:1 to about 1:0.1 based on weight. The impregnating weight ratio is especially about 1:2 to 2:1.

The impregnating composition for the wood or cellulosic fillers may be applied by almost any technique available to those skilled in the art such as for example, spraying by the impregnating solution, fluidized bed, and by slurrying the wood fillers in the impregnating solution.

Particularly, the treated fillers after drying contain at least about 0.1 weight % to about 20 weight % hindered amine; more preferably the treated fillers contain at least 1.0 weight % to about 5 weight % hindered amine based on the dry weight of the fillers; most preferably the treated fillers contain at least 1.0 weight % to about 3 weight % hindered amine based on the dry weight of the fillers but usually not more than 6 weight %.

The treatment of the cellulosic or wood based fillers with the hindered amine solution, suspension or dispersion must be done prior to blending of the fillers with the matrix polymer. The impregnation composition used to treat the cellulosic or wood based material is essentially free of the matrix composite polymer.

For the purposes of the invention the matrix composite polymer means the polymer or polymers comprising the final wood-polymer composite.

For the purposes of the invention a wood or cellulosic material essentially free of the matrix composite polymer means the wood or cellulosic material is not encapsulated or blended with a solid polymeric material before treatment with an aqueous solution, suspension or dispersion of hindered amine.

Additives added to the polymer matrix can also be added to the composite in the form of a masterbatch ("concentrate") which contains the additives in a concentration of, for example, about 5% to about 90%, or about 10% to about 90% by weight based on the weight of the carrier resin. The carrier resin may not necessarily be of identical structure to the thermoplastic resin where the additives are added finally.

A concentrate or masterbatch can also be made by the process of the invention by treating the cellulosic fillers with an aqueous solution, suspension or dispersion of hindered amine before combining via a melt with solid polymer.

This method could also be used to treat cellulosic fillers with an aqueous solution, suspension or dispersion of hindered amine before combining with thermoplastic polymer materials, for example, wood fiber and polyvinyl chloride to form a pellet of composite material to be later used in forming structural members. The composite material can be used to form structural members instead of wood, polyvinyl chloride, or metal such as aluminum.

The impregnation composition may contain polymers such as for example penetrants, binders, dispersants, surfactants, and compatibilizers or mixtures thereof but the impregnation composition is preferably an aqueous liquid and allows the hindered amine light stabilizers to come into direct contact with the wood or cellulosic surface.

Preferably the binder of the impregnation composition is selected from the group consisting of alkyd resins, modified alkyd resins, autocrosslinking or non-autocrosslinking acrylic resins, polyester resins, drying oils, phenolic resins, nitrocellulose, cellulose-aceto-butyrate or mixtures thereof. The binder is preferably soluble or easily dispersed in an aqueous solution, suspension or dispersion.

The penetrant may be selected from the group consisting of hydrophilic modified oils and high boiling liquids which remain in the wood, for example higher alkanols, glycols, glycol ethers, glycol ester polyglycols or PEG modified oils.

The hindered amine compound b) is preferably present in the treated wood or cellulosic material to give an amount of 0.1-20%, more preferred 0.2-10% and most preferred 0.2-5% by weight based on the dry weight of the cellulose or wood based material.

The hindered amine compounds b) are known and partially commercially available or may be produced by chemical standard methods. Examples are given in J. Polym Sci. Polym. Chem. Ed., 22, 277-281 (1984) and in U.S. Pat. No. 4,831,134. The salts are readily prepared from the corresponding amine precursor and a suitable acid.

The intermediates needed to make the instant compounds are largely items of commerce.

The cellulosic or wood material is preferably dried after treatment with the impregnating composition and before blending with the matrix polymer and forming the composite.

The treated cellulosic or wood material is dried to a moisture content less than about 12% by weight, preferably a moisture content of less than about 5% by weight and most preferably less than about 2%.

The time required for drying the filler will vary according to the type of wood filler, degree of moisture present and particle size of the filler.

The treated cellulosic filler is dried at a temperature of about 60 to 150° C.; preferably at a temperature of about greater than 130° C.

Typical examples of organic solvents which may suitably be used for impregnating compositions are aliphatic, aromatic or cycloaliphatic hydrocarbons, alcohols, esters, ketones.

Water/solvent mixtures are typically mixtures of water and lower alcohols, glycols, glycol ethers or polar solvents.

It is preferable to use water or water-alcohol mixtures as the solvent.

Although the impregnating composition contains at least one of the sterically hindered amine of formulae of (I) and (II) and affords good protection against light, it may be advantageous to add other conventional light stabilizers to the impregnating composition or to the polymer matrix during extrusion or molding. Illustrative examples of suitable conventional light stabilizers are the following compounds:

Typically the light stabilizers or ultraviolet absorbers may make up about 0.1 weight % to about 20 weight %; preferably about 0.5 weight % to about 20 weight %; most preferably about 1 weight % to about 20 weight % based on the total weight of the impregnating solution, suspension or dispersion.

It is preferable that the ultraviolet absorbers are water-soluble. Water-soluble in the sense of the present invention means that the ultraviolet absorber is at room temperature soluble at least 0.1% by weight, more preferably at least 1% and most preferably at least 5% based on the amount of water.

After drying the wood or cellulose fillers, the weight % of the ultraviolet absorber is at least about 0.1%; preferably at least about 0.5%; most preferably at least about 1% of the total weight of the dried wood or cellulose fillers.

UV Absorbers and Light Stabilisers 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl- 2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(a,a-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$ where R=3'-tert-butyl-4'-hydroxy-5'-2H-benzotriazol-2-ylphenyl, 2-[2'-hydroxy-3'-(a,a-dimethylbenzyl)-5'-(1,1,3,3-tetramethylbutyl)-phenyl]benzotriazole; 2-[2'-hydroxy-3'-(1,1,3,3-tetramethylbutyl)-5'-(a,a-dimethylbenzyl)-phenyl]benzotriazole; 3-(2H-benzotriazol-2-yl)-4-hydroxy-5-(1-methylpropyl)-, benzenesulfonic acid monosodium salt.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl a-cyano-b,b-diphenylacrylate, isooctyl a-cyano-b,b-diphenylacrylate, methyl a-carbomethoxycinnamate, methyl a-cyano-b-methyl-p-methoxy-cinnamate, butyl a-cyano-b-methyl-p-methoxycinnamate, methyl a-carbomethoxy-p-methoxycinnamate and N-(b-carbomethoxy-b-cyanovinyl)-2-methylindoline.

Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-a-olefin-copolymer with 2,2,6,6-tetramethyl-4-aminopiperidine or 1,2,2,6,6-pentamethyl-4-aminopiperidine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]4,6-bis(2,4-dimethyl)-1,3,5-triazine, 2-[4-(dodecyloxy/tridecyloxy-2-hydroxypropoxy)-2-hydroxy-phenyl]4,6-bis(2,4-dimethylphenyl)-1,3,5-triazine, 2-[2-hydroxy-4-(2-hydroxy-3-dodecyloxy-propoxy)phenyl]-4,6-bis(2,4- dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Transparent iron oxides, for example finely divided zinc oxide or titanium dioxide.

The drying of the treated cellulosic filler may be dried by any conventional means known in the art such as tumble driers, ovens and IR lamps.

The thermoplastic resins are synthetic resins and are selected from:

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE);

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE);

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides;

4. Hydrocarbon resins (for example $C_5$-$C_9$) including hydrogenated modifications thereof (e.g. tackifiers) and mixtures of polyalkylenes and starch;

Homopolymers and copolymers from 1.)-4.) may have any stereostructure including syndiotactic, isotactic, hemi-isotactic or atactic; where atactic polymers are preferred.

Stereoblock polymers are also included;

5. Polystyrene, poly(p-methylstyrene), poly(.alpha.-methylstyrene);

6. Aromatic homopolymers and copolymers derived from vinyl aromatic monomers including styrene, .alpha.-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included;

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene;

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH);

6c. Hydrogenated aromatic polymers derived from hydrogenation of polymers mentioned under 6a.);

Homopolymers and copolymers may have any stereostructure including syndiotactic, isotactic, hemi-isotactic or atactic; where atactic polymers are preferred. Stereoblock polymers are also included;

7. Graft copolymers of vinyl aromatic monomers such as styrene or .alpha.-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers;

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride (PVC), polyvinylidene chloride, polyvinyl fluoride, polyvinylidene fluoride, as well as copolymers thereof such as vinyl chloride/ vinylidene chloride, vinyl chloride/vinyl acetate or vinylidene chloride/vinyl acetate copolymers;

9. Polymers derived from α,β-unsaturated acids and derivatives thereof such as polyacrylates and polymethacrylates; polymethyl methacrylates, polyacrylamides and polyacrylonitriles, impact-modified with butyl acrylate;

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers;

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above;

12. Homopolymers and copolymers of cyclic ethers such as polyalkylene glycols, polyethylene oxide, polypropylene oxide or copolymers thereof with bisglycidyl ethers;

3. Polyacetals such as polyoxymethylene and those polyoxymethylenes which contain ethylene oxide as a comonomer; polyacetals modified with thermoplastic polyurethanes, acrylates or MBS;

14. Polyphenylene oxides and sulfides, and mixtures of polyphenylene oxides with styrene polymers or polyamides;

15. Polyurethanes derived from hydroxyl-terminated polyethers, polyesters or polybutadienes on the one hand and aliphatic or aromatic polyisocyanates on the other, as well as precursors thereof;

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexame-thylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems);

17. Polyureas, polyimides, polyamide-imides, polyetherimides, polyesterimides, polyhydantoins and polybenzimidazoles;

18. Polyesters derived from dicarboxylic acids and diols and/or from hydroxycarboxylic acids or the corresponding lactones, for example polyethylene terephthalate (PET), polyethylene terephthalate glycol modified (PETG), polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS;

19. Polycarbonates and polyester carbonates;

20. Polyketones;

21. Polysulfones, polyether sulfones and polyether ketones;

22. Crosslinked polymers derived from aldehydes on the one hand and phenols, ureas and melamines on the other hand, such as phenol/formaldehyde resins, urea/formaldehyde resins and melamine/formaldehyde resins;

23. Drying and non-drying alkyd resins;

24. Unsaturated polyester resins derived from copolyesters of saturated and unsaturated dicarboxylic acids with polyhydric alcohols and vinyl compounds as crosslinking agents, and also halogen-containing modifications thereof of low flammability;

25. Crosslinkable acrylic resins derived from substituted acrylates, for example epoxy acrylates, urethane acrylates or polyester acrylates;

26. Alkyd resins, polyester resins and acrylate resins crosslinked with melamine resins, urea resins, isocyanates, isocyanurates, polyisocyanates or epoxy resins;

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators; and 28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Polyolefins, i.e. the polymers of monoolefins exemplified in the preceding paragraph, preferably polyethylene and polypropylene, can be prepared by different, and especially by the following, methods:

a) radical polymerization (normally under high pressure and at elevated temperature).

b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either .pi.- or .sigma.-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

In particular, the present thermoplastic resin is selected from polyethylene (PE), polypropylene (PP), ABS, polystyrene (PS) and polyvinyl chloride (PVC).

In particular, the composites of the present invention are PE, PP, ABS, PS or PVC with wood flour.

Any moldable polyolefin or mixture of polyolefins may be used for purposes of the present invention, including high and low density polyethylene, polypropylene, ionomers, other copolymers, including engineered thermoplastic polyolefin (TPO), which may consist of polypropylene compounded with rubber. The polyolefin component are for example selected from the group consisting of HDPE and polypropylene, for example from post consumer or post industrial waste plastics, specifically waste HDPE, such as that reclaimed from used milk jugs or grocery bags. It should be apparent to one skilled in the art that virgin plastic may be used equally effectively, although the benefit of productively utilizing waste plastic is then lost.

The composites of the present invention contain for example about 20% to about 80% by weight thermoplastic resin based on the entire mixture. For example, the thermoplastic resin is present from about 30% to about 50%, or from about 35% to about 45% by weight based on the entire mixture. Accordingly, the natural products are present from about 80% to about 20%, about 70% to about 50%, or about 65% to about 55% by weight, based on the weight of the entire mixture.

The polymeric matrix material may be selected from polyolefins such as polyethylene, polypropylene, low density polyethylene (LDPE), high density polyethylene (HDPE) and polystyrene. Other thermoplastics are envisioned such as polyvinyl chloride and ethyl-vinyl acetate. Any polymer exhibiting a melting temperature of less than about 250° C. may advantageously be employed as the matrix polymer.

The polyolefin components are preferably selected from the group consisting of HDPE and polypropylene. Recycled waste such as post consumer or post industrial waste plastics, specifically waste HDPE, such as that reclaimed from used milk jugs are also envisioned.

In addition to the polyolefin plastics, additional thermoplastics such as nylons and engineered thermoplastic polyolefins may be included with the composition to increase the impact resistance and stiffness of the material.

The polymer matrix composition may include additional additives such as fire retardants, bonding agents, lubricants, additional stabilizers and compatibilizers. These may be added to the melt individually or as concentrates or masterbatches.

Fire retardants such as alumina trihydrate may be added. Known flame retardants are from example organohalogen compounds, melamine based compounds, phosphorus containing compounds metal hydroxides and borates.

Bonding agents or compatibilizers such as EPOLENE APG-11, EPOLENE APG-7 from Eastman and EXXELOR VA 1801, 1803, 1840, PO 1015 and 1020 from Exxon may be used to further enhance bonding between the cellulosic fillers and the polymer of the natural composite. Typical examples of compatibilzers are maleated polyolefins, maleated polypropylene and maleated copolymers or terpolymers of ethylene and mixtures thereof.

Exemplary lubricants include silicone oil, fatty amides, such as ethylene bis-stearamide and oleyl palmitamide, metal stearates and mixtures thereof. For example, Stuktol and Baerlocher sell a range of lubricants specifically for improving the processing of wood-filled thermoplastics such as BAEROLUB LA-SP, STRUKTOL TPW 104, STRUKTOL TPW 113, STRUKTOL TPW 012 AND STRUKTOL TPW 101.

In a further preferred embodiment of the present invention an additional stabilizer selected from the group consisting of a sterically hindered phenol, a phosphite or phosphonite or mixtures thereof is used.

Examples of sterically hindered phenols, useful as antioxidants are given below.

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tri cyclohexylphenol, 2,6-di-tert-butyl-4-methoxymethylphenol, 2,6-di-nonyl-4-methyl-phenol.

2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxy phenol.

3. Hydroxylated thiodiphenyl ethers, for example 2,2'-thiobis(6-tert-butyl-4-methyl phenol), 2,2'-thiobis(4-octylphenol), 4,4'-thiobis(6-tert-butyl-3-methylphenol), 4,4'-thiobis(6-tert-butyl-2-methylphenol).

4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(a-methyl cyclohexyl)phenol], 2,2'-methylenebis(4-methyl-6-cyclohexylphenol), 2,2'-methylene bis(6-nonyl-4-methylphenol), 2,2'-methylenebis(4,6-di-tert-butylphenol), 2,2'-ethylidene bis(4,6-di-tert-butylphenol), 2,2'-ethylidenebis(6-tert-butyl-4-isobutylphenol), 2,2'-methylenebis[6-(a-methylbenzyl)-4-nonylphenol], 2,2'-methylenebis[6-(a,a-dimethyl benzyl)-4-nonylphenol], 4,4'-methylenebis(2,6-di-tert-butylphenol), 4,4'-methylene bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxy phenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4methylphenyl]terephthalate.

5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl)sulfide, isooctyl 3,5-di-tert-butyl-4-hydroxybenzylmercaptoacetate, bis(4-tert-butyl-3-hydroxy-2,6-dimethylbenzyl)dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

7. Esters of β-(3,5-di-tert-butyl-4-hydroxyphenyl)propionic acid with mono- or polyhydric alcohols, e.g. with methanol, octadecanol, 1,6-hexanediol, neopentyl glycol, triethylene glycol, pentaerythritol, tris(hydroxyethyl)isocyanurate, thiodiethylene glycol, N,N'-bis(hydroxyethyl)oxalodiamide.

8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis (hydroxyethyl)oxalodiamide.

9. Esters of β-(3,5-dicyclohexyl-4-hydroxyphenyl)propionic acid with mono- or poly hydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl) oxalodiamide.

10. Amides of β-(3,5-di-tert-butyl-4-hydroxyphenyl)propionic acid e.g. N,N'-bis(3,5-di-tert-butyl-4-hydroxyphenyl-propionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Non-Phenolic Stabilizers

Additional additives (stabilizers, non-phenolic) which may be used in the composite are benzofuran-2-ones, such as described, for example, in U.S. Pat. No. 4,325,863, U.S. Pat. No. 4,338,244 or U.S. Pat. No. 5,175,312. Examples or such non-phenolic stabilizers are 3-[4-(2-acetoxyethoxy)phenyl]-5,7-di-tert-butyl-benzofuran-2-one 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

In specific cases it may be advantageous to use two or more antioxidants.

Examples of useful phosphites, or phosphonites are: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl)phosphite (Irgafos® 168, Ciba-Geigy), tris(nonylphenyl)phosphite,

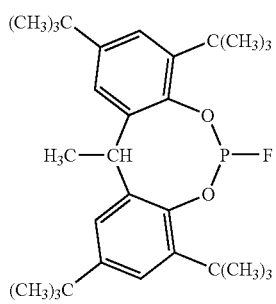
(A)

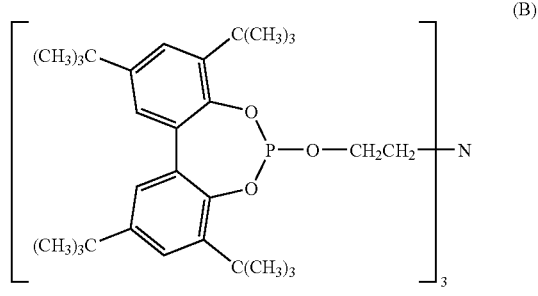
(B)

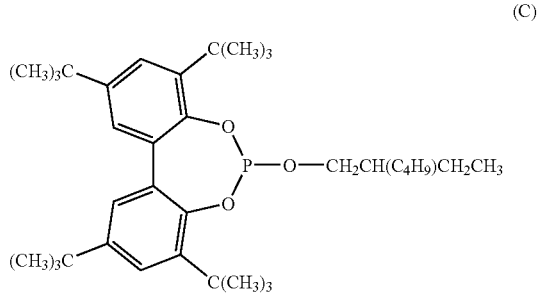
(C)

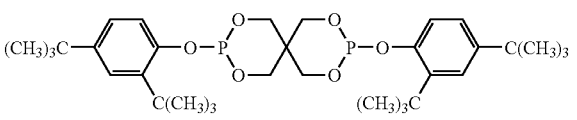
(D)

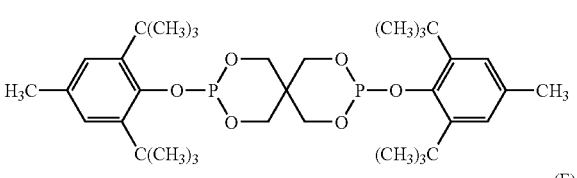
(E)

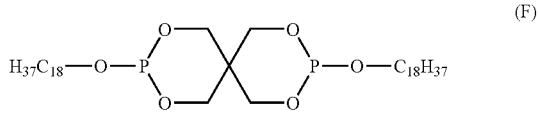
(F)

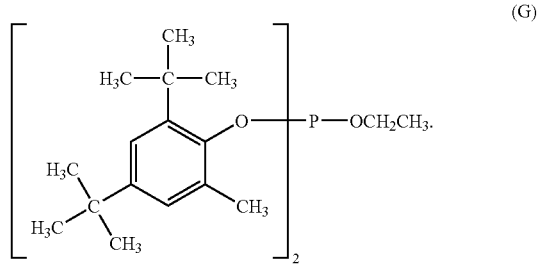
(G)

The sterically hindered phenols, phosphites or phosphonites are preferably present in an amount of 0.01%-5% by weight based on the total formulation.

The natural product composition may also contain preservatives such as fungicides or insecticides. Exemplary of useful fungicides are azaconazol, tebuconazol, propiconazol, tributyltin oxide, phenylmercury salts, copper naphthenate, Zn borate, hydroxides or silicates of Ca, Mg, Al or Zn, 1-chloronaphthalene or pentachlorophenol. Exemplary of useful insecticides are DDT, dieldrin, lindane, cypermethrin, deltamethrin benzalkoniumhydrochloride, and parathion.

The preservative or biocide may also for example be an organic iodine-containing compound such as 3-bromo-2,3-diiodo-2-propenylethyl carbonate, 3-iodo-2-propynylbutyl carbamate (IPBC), 2,3,3-triiodoallyl alcohol and p-chlorophenyl-3-iodopropargyl formal; a benzimidazole- or benzothiazole-based compound such as 2-(4-thiazolyl)benzimidazole and 2-thiocyanomethyl thiobenzothiazole; a triazole-based compound such as 1-(2-(2',4'-dichlorophenyl)-1,3-dioxolan-2-ylmethyl)-1H-1,2,4-triavole, 1-(2-(2',4'-dichlorophenyl)-propyl-1,3-dioxolan-2-ylmethyl)-1H-1,2,4-triazole, .alpha.-(2-(4-chlorophenyl)ethyl)-.alpha.-(1,1-dimethylethyl)-1H-1,2,4-triavole-1-ethanol and .alpha.-(4-chlorophenyl)-.alpha.-(1-cyclopropylethyl)-1H-1,2,4-triazole-1-ethanol and; an organic zinc compound such as zinc bis-(2-pyridine-thiole-1-oxide)phthalate; a benzoic acid-based compound such as 4-isopropyltropolone (hinokitiol), benzoic acid, sodium benzoate and n-butyl p-oxybenzoate and a natural compound such as borax.

Further ingredients which may be present in the composite composition are minor amounts of accelerators (hardeners) for the binders, dyes or pigments, penetration aids and surface active ingredients.

These other additives can be blended with the composite in all customary mixing machines in which the thermoplastic resin is melted and mixed with the additives. Suitable machines are known to those skilled in the art. They are predominantly mixers, kneaders and extruders.

Particularly preferred processing machines are single-screw extruders, contra-rotating and co-rotating twin-screw extruders, planetary-gear extruders, ring extruders or cokneaders. It is also possible to use processing machines provided with at least one gas removal compartment to which a vacuum can be applied.

The temperature of the ingredients in the extruder barrel of the extruder is preferably from about 100-260° C. and more preferably from about 120-240° C.

The present invention is further illustrated by the following non-limiting Examples. Percentages are by weight unless otherwise specified.

Wood Flour (WF) Treatment Description 1-oxyl-2,2,6,6-tetramethyl-4-hydroxypiperidine, compound A (1-5%) is dissolved in water. WF is added under constant stirring with a dispermat at low speed until wood flour is soaked completely. The weight ratio of the hindered amine solution to WF is 2:1. The mixture is stored for 24 hrs under constant stirring. The excess water is filtered off and the wet WF is dried in an electro oven at 100° C. for 24 hrs to give a final moisture content of 1-2%.

Formulation for WPC:
  50% Wood flour (soft wood)
  2% Coupling agent, a standard Polypropylene-grafted-Methacrylic acid
  5% Standard Polypropylene wax
  43% Poplypropylene Moplen RP 340 powder (with standard stabilization: 0.15% CHIMASSORB® 944+0.15% TINUVIN® 326)

Preparation of WPC
  Process: on a two-roll mill and pressed afterwards.
  Dry WF for at least 4 hrs until water content <1%.
  Mix all components by hand and process in the following order: polymer with melting, additives and colorants until homogeneous material is obtained, followed by WF mixed with coupling agent
  Put in small portions on two roll mill at 165° C. for 8 min.
  Press samples at 190° C. for 2 min/50 bar and 1 min/100 bar
  One set of samples (30×45 mm) are exposed with Xenon light according DIN/ISO/EN 11341 (see table 1).

Another set of samples is coated with a polyurethane clear coat by brush (1×100 g/m$^2$)(see formulation table 2) and exposed in same way.

Results after artificial weathering are summarized in table 3 (samples without top coat) and table 4 (samples with top coat).

The color measurement with calculation of L*, C*, h and ΔE* is done according DIN 6174 as well as the grey scale according DIN EN 20105-A02 after Xenon lamp light exposure. The 60° gloss is measured according DIN 67530.

TABLE 1

Accelerated weathering (DIN/ISO/EN 11341)

| Machine type: | Atlas Weather-O-meter Ci-65 A (two-tier rack) |
|---|---|
| Exposure Conditions: | |
| Light Source: | 6.5 kW Xenon burner water-cooled |
| Filter combination: | Outer filter Boro S/Inner filter Boro S |
| Procedure: | A |
| 102 min. | Light |
| 0.35 W/m$^2$@340 nm | Irradiance, controlled |
| 60 (±2) ° C. | Black panel temperature |
| 35 (±5) % | Rel. humidity at the end of the dry period |
| 18 min. | Light and Spray |
| 0.35 W/m$^2$@340 nm | Irradiance, controlled |
| 35 (±2) ° C. | Black panel temperature |
| 95 (±5) % | Rel. humidity |

TABLE 2

Formulation of the Polyurethane clear coating system

| Polyurethane Clear Coat | |
|---|---|
| Macrynal SM 510n (60%) | 1125.00 |
| Butylglycolacetate (BGA) | 225.00 |
| Solvesso ® 100 | 91.50 |
| Methylisobutylketone (MIBK) | 54.00 |
| Nuodex Zn Oktat (8%) | 1.50 |
| BYK 300 | 3.00 |
| Σ component 1 | 1500.00 |
| Component 1 | 100.00 |
| Desmodur ® N75 | 40.00 |
| Σ component 1 + 2 | 140.00 |

TABLE 3

Results after 400 hrs artificial weathering of series without Polyurethane clear top coat

| Wood flour | Δ60° Gloss | Grey scale | ΔE | ΔL* | ΔH* | ΔC* |
|---|---|---|---|---|---|---|
| No pre-treatment | 27 | 2 | 19.8 | 8.32 | −3.16 | −17.67 |
| +1% compound A | 17 | 2/3 | 16.0 | 7.70 | 0.37 | −10.01 |
| +2% compound A | 21 | 3/4 | 16.6 | 5.23 | 0.63 | −10.42 |
| +5% compound A | 19 | 4 | 18.1 | 2.08 | 0.74 | −9.83 |

For the non-coated samples strong whitening, discoloration and bleaching effects can be seen after 400 hrs weathering. This is caused by the lignin degradation in the WF. Lignin degradation causes water soluble colored chromophores. These chromophores will be washed out due to the presence of water in the Xenon exposure cycle with remaining white cellulose fibres. Compound A pre-treatment prevents lignin from degradation and therefore the chromophore formation. This can be clearly seen by reduced bleaching (ΔL*), hue ($\Delta H^*$) and chroma ($\Delta C^*$) deviation, higher grey scale values as well as better gloss retention due to Compound A pretreatment.

TABLE 4

Results after 1000 hrs artificial weathering of series with Polyurethane clear top coat

| Wood flour | $\Delta 60°$ Gloss | Grey scale | $\Delta E$ | $\Delta L^*$ | $\Delta H^*$ | $\Delta C^*$ |
|---|---|---|---|---|---|---|
| No pre-treatment | — | ½ | 13.5 | −11.37 | −4.61 | 5.51 |
| +1% Compound A | — | 4 | 7.0 | 4.29 | 1.30 | 5.42 |
| +2% Compound A | — | ⅘ | 6.2 | 4.78 | 1.22 | 3.82 |
| +5% Compound A | — | 5 | 5.5 | 4.65 | 0.42 | 2.91 |

In contrast the coated samples without WF pre-treatment according to the invention show strong darkening and coloration can be seen after 1000 hrs weathering. This is caused by the lignin degradation with colored chromophores formation. The polyurethane top coat keeps the chromophores from washing out. Because pre-treatment of the WF according to the invention prevents lignin from degrading and chromophore formation lower color deviation ($\Delta E^*$) with lower chroma deviation ($\Delta C^*$), reduced darkening ($\Delta L^*$) and higher grey scale values are obtained.

Both Tables 3 and 4 show the pre-treatment of the woodflour according to the invention prevents lignin from degradation and therefore stops chromophore formation which leads to the well-known wood erosion effects. Lignin can be seen as the weak part in the WPC. Therefore a stabilization of this weak part is essential to improve the overall performance of the composite material. In general better results will be obtained if a top coat or a co-extruded plastic layer is present which avoids the contact of WF with water.

The invention claimed is:

1. A method of protecting natural composites against light-induced degradation which method comprises the steps of
treating wood based fillers with an impregnating composition to form an impregnated wood based filler wherein the impregnating composition comprises
a) water or water/organic solvent and
b) a sterically hindered amine which is selected from at least one of the compounds of formulae (I) and (II)

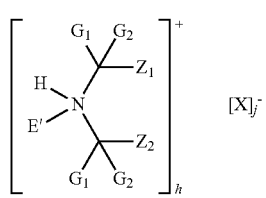

(I)

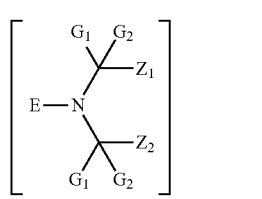

(II)

wherein
$G_1$ and $G_2$ are independently alkyl of 1 to 4 carbon atoms or are together pentamethylene; $Z_1$ and $Z_2$ are each methyl, or $Z_1$ and $Z_2$ together form an unsubstituted linking moiety or a linking moiety substituted by one or more groups selected from an ester, ether, hydroxy, oxo, cyanohydrin, amide, amino, carboxy or an urethane group;

E is oxyl, hydroxyl, hydrogen or methyl;

E' is hydroxyl, hydrogen or methyl;

X is an inorganic or organic acid; and, wherein the total charge of h cations is equal to the total charge of j anions;

drying the impregnated fillers, and melt blending the impregnated fillers with a polymer—to form a melt blend—to form the natural composite, wherein the wood based fillers are selected from the group consisting of sawdust, alfalfa, wheat pulp, wood chips, wood fibers, wood particles, ground wood, wood flour, wood flakes, wood veneers, wood laminates, straw, cotton, rice huls, coconut shells, peanut shells, bagass, plant fibers, hemp, bamboo, palm fiber and kenaf and the wood based fillers are treated with the impregnating composition prior to combining the wood based fillers with the polymer to form the natural composite.

2. A method according to claim 1, wherein the sterically hindered amine of component b) is selected from the compounds of formulae A to EE and A* to EE* and III to IIIc

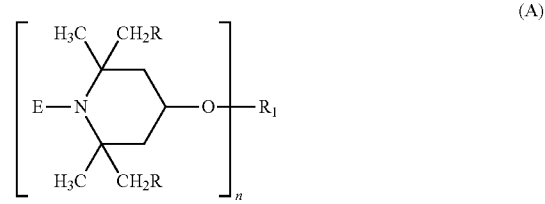
(A)

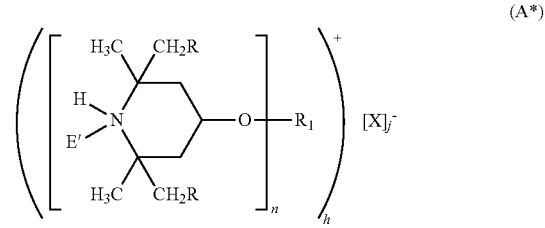
(A*)

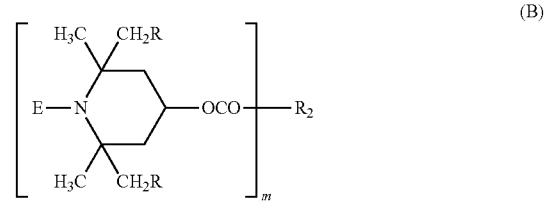
(B)

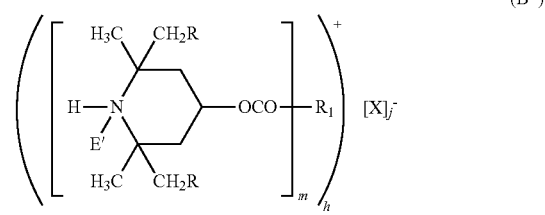
(B*)

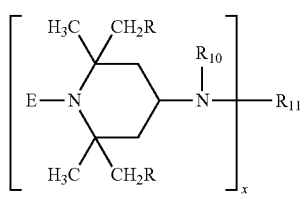 (C)
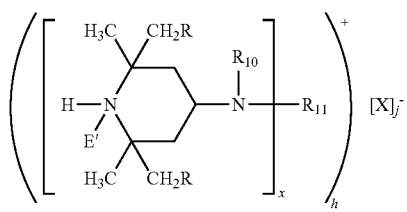 (C*)
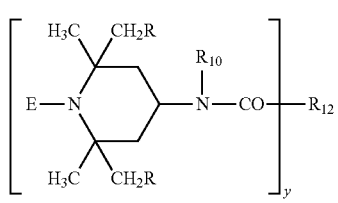 (D)
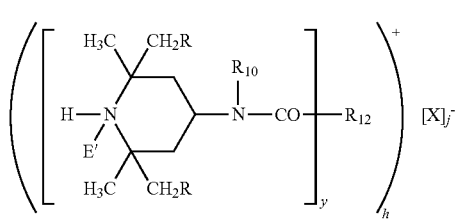 (D*)
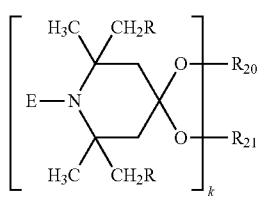 (E)
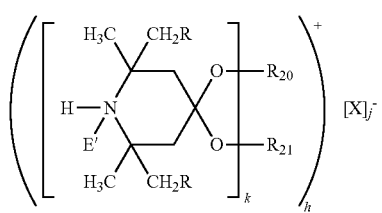 (E*)
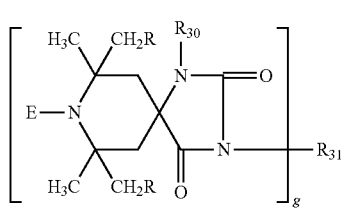 (F)
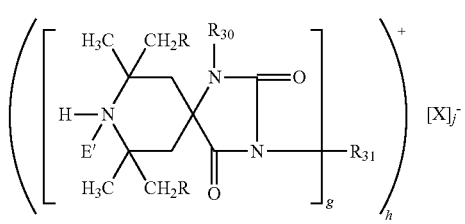 (F*)
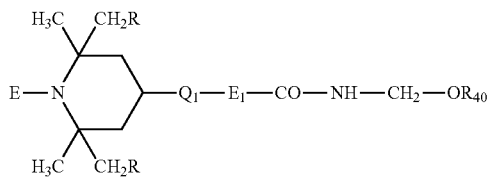 (G)
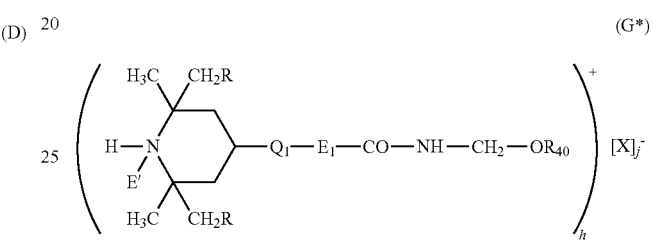 (G*)
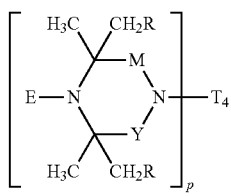 (H)
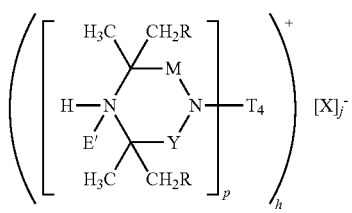 (H*)
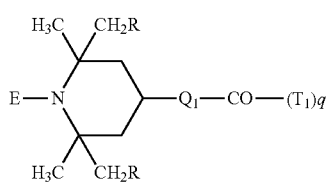 (I)
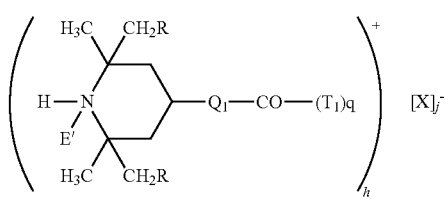 (I*)

-continued
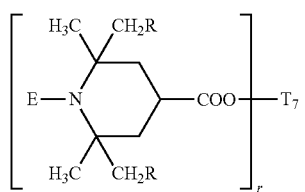 (J)
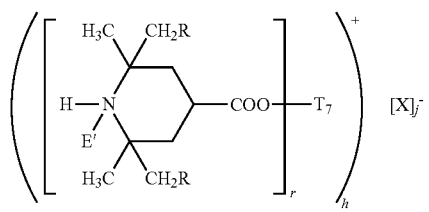 (J*)
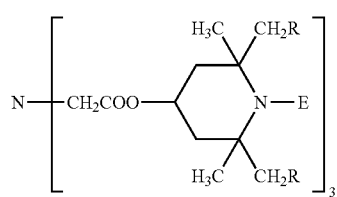 (K)
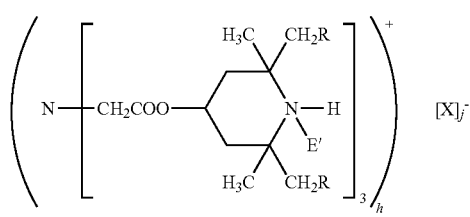 (K*)
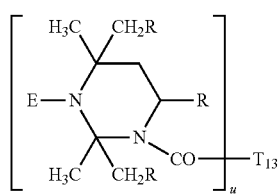 (L)
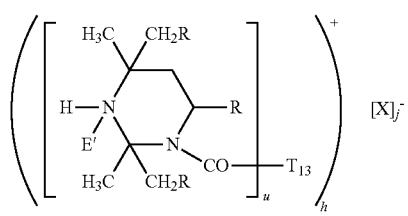 (L*)
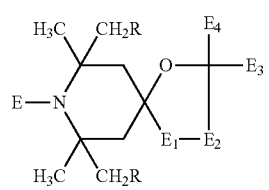 (M)
-continued
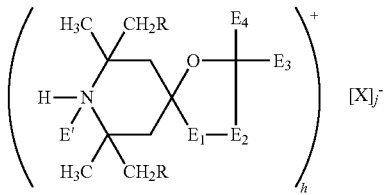 (M*)
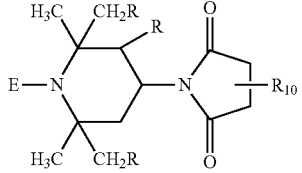 (O)
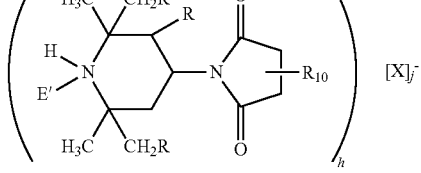 (O*)
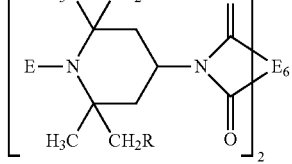 (P)
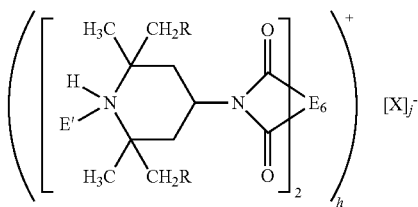 (P*)
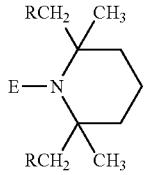 (Q)
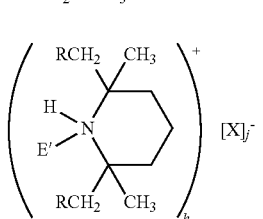 (Q*)
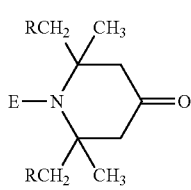 (R)

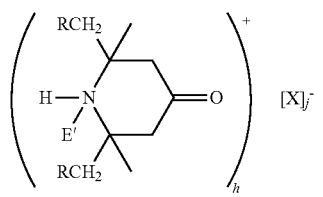
(R*)
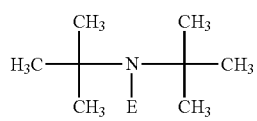
(S)
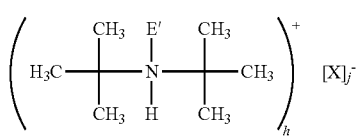
(S*)
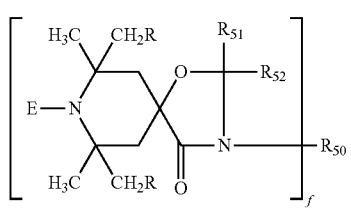
(T)
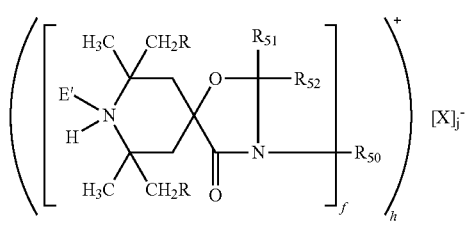
(T*)
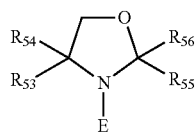
(U)
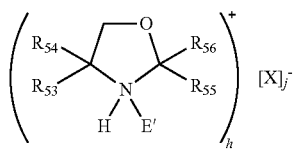
(U*)
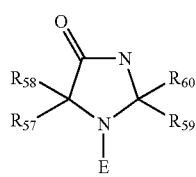
(V)
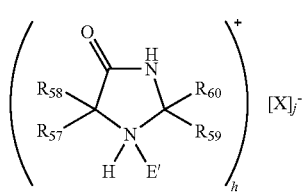
(V*)
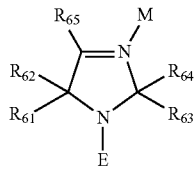
(W)
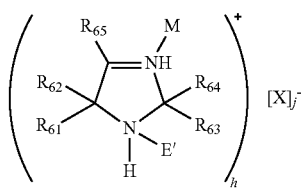
(W*)
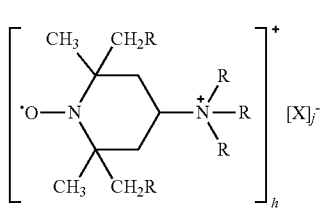
(X)
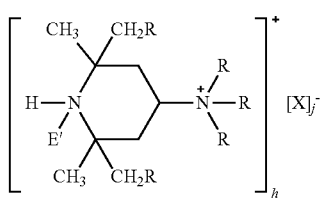
(X*)
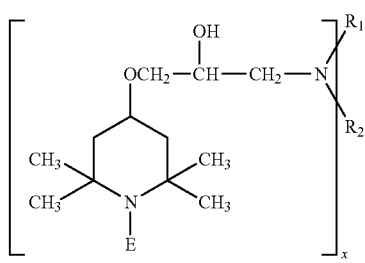
(Y)
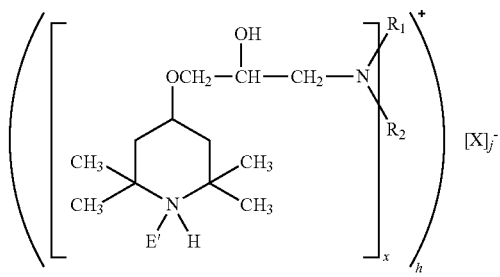
(Y*)
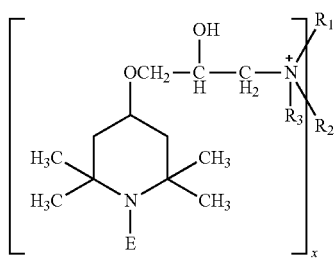
(Z)

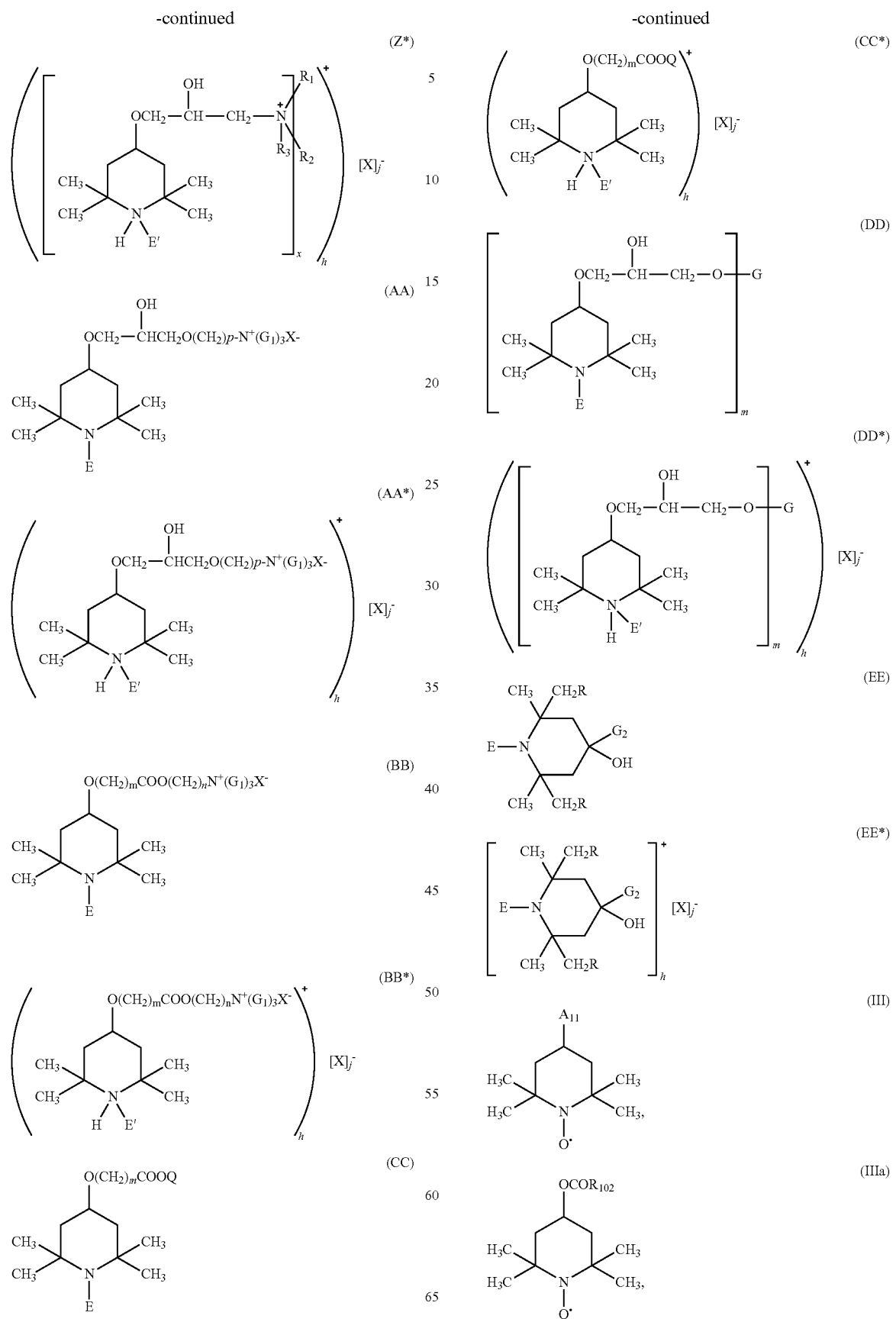

-continued

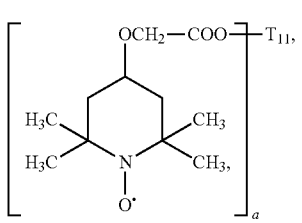
(IIIb)

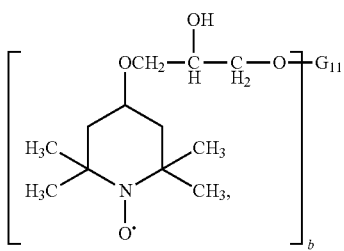
(IIIc)

wherein
E is oxyl, hydroxyl, hydrogen or methyl,
E' is hydroxyl, hydrogen or methyl,
R is hydrogen or methyl,
in formula A and A*,
n is 1 or 2,
when n is 1,
$R_1$ is hydrogen, alkyl of 1 to 18 carbon atoms, alkenyl of 2-18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1-3 and M is a metal ion from the 1st, 2nd or 3rd group of the periodic table or is Zn, Cu, Ni or Co, or M is a group N$^{n+}$(R$_2$)$_4$ where $R_2$ is alkyl of 1 to 8 carbon atoms or benzyl,
when n is 2,
$R_1$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups,
in formula B and B*,
m is 1 to 4,
when m is 1,
$R_2$ is alkyl of 1 to 18 carbon atoms, alkyl of 3 to 18 carbon atoms interrupted by —COO—, alkyl of 3 to 18 carbon atoms substituted by COOH or COO—, or $R_2$ is —CH$_2$(OCH$_2$CH$_2$)$_n$OCH$_3$ where n is 1 to 12, or
$R_2$ is cycloalkyl of 5 to 12 carbon atoms, aryl of 6 to 12 carbon atoms, or said aryl substituted by one to four alkyl groups of 1 to 4 carbon atoms, or
$R_2$ is —NHR$_3$ where $R_3$ is alkyl of 1 to 18 carbon atoms, cycloalkyl of 5 to 12 carbon atoms, aryl of 6 to 12 carbon atoms, or said aryl substituted by one to four alkyl of 1 to 4 carbon atoms, or
$R_2$ is —N(R$_3$)$_2$ where $R_3$ is as defined above,
when m is 2,
$R_2$ is alkylene of 1 to 12 carbon atoms, alkenylene of 4 to 12 carbon atoms, xylylene, alkylene of 2 to 12 carbon atoms interrupted by —COO—, alkylene of 3 to 18 carbon atoms substituted by COOH or COO—, or $R_2$ is —CH$_2$(OCH$_2$CH$_2$)$_n$OCH$_2$— where n is 1 to 12, or
$R_2$ is cycloalkylene of 5 to 12 carbon atoms, aralkylene of 7 to 15 carbon atoms or arylene of 6 to 12 carbon atoms, or
$R_2$ is —NHR$_4$NH— where $R_4$ is alkylene of 2 to 18 carbon atoms, cycloalkylene of 5 to 12 carbon atoms, aralkylene of 8 to 15 carbon atoms or arylene of 6 to 12 carbon atoms, or
$R_2$ is —N(R$_3$)R$_4$N(R$_3$)— where $R_3$ and $R_4$ are as defined above, or
$R_2$ is —CO— or —NH—CO—NH—,
when m is 3,
$R_2$ is alkanetriyl of 3 to 8 carbon atoms or benzenetriyl, or
when m is 4,
$R_2$ is alkanetetrayl of 5 to 8 carbon atoms or benzenetetrayl,
with the proviso that bis(1,2,2,6,6-pentamethyl-4-piperidinyl)sebacate and methyl (1,2,2,6,6-pentamethyl-4-piperidinyl) sebacate are excluded,
in formula C and C*,
$R_{10}$ is hydrogen, alkyl of 1 to 18 carbon atoms, cycloalkyl of 5 to 12 carbon atoms, aralkyl of 7 to 15 carbon atoms, alkanoyl of 2 to 18 carbon atoms, alkenoyl of 3 to 5 carbon atoms or benzoyl,
x is 1 or 2,
when x is 1,
$R_{11}$ is hydrogen, alkyl of 1 to 18 carbon atoms, alkenyl of 2 to 18 carbon atoms, propargyl, glycidyl, alkyl of 2 to 50 carbon atoms interrupted by one to twenty oxygen atoms, said alkyl substituted by one to ten hydroxyl groups or both interrupted by said oxygen atoms and substituted by said hydroxyl groups, or
$R_{11}$ is alkyl of 1 to 4 carbon atoms substituted by a carboxy group or by —COOZ where Z is hydrogen, alkyl of 1 to 4 carbon atoms or phenyl, or where Z is said alkyl substituted by —(COO$^-$)$_n$M$^{n+}$ where n is 1-3 and M is a metal ion from the 1st, 2nd or 3rd group of the periodic table or is Zn, Cu, Ni or Co, or M is a group N$^{n+}$(R$_2$)$_4$ where $R_2$ is hydrogen, alkyl of 1 to 8 carbon atoms or benzyl, or
when x is 2,
$R_{11}$ is alkylene of 1 to 12 carbon atoms, alkenylene of 4 to 12 carbon atoms, xylylene or alkylene of 1 to 50 carbon atoms interrupted by one to twenty oxygen atoms, substituted by one to ten hydroxyl groups or both interrupted by said oxygen atoms and substituted by said hydroxyl groups,
in formula D and D*,
$R_{10}$ is as defined above,
y is 1 to 4, and
$R_{12}$ is defined as $R_2$ above,
in formula E and E*,
k is 1 or 2,
when k is 1,
$R_{20}$ and $R_{21}$ are independently alkyl of 1 to 12 carbon atoms, alkenyl of 2 to 12 carbon atoms or aralkyl of 7 to 15 carbon atoms, or $R_{20}$ is also hydrogen, or
$R_{20}$ and $R_{21}$ together are alkylene of 2 to 8 carbon atoms or said alkylene substituted by hydroxyl, or are acyloxyalkylene of 4 to 22 carbon atoms, or
when k is 2,
$R_{20}$ and $R_{21}$ are together (—CH$_2$)$_2$C(CH$_2$—)$_2$,
in formula F and F*,
$R_{30}$ is hydrogen, alkyl of 1 to 18 carbon atoms, benzyl, glycidyl, or alkoxyalkyl of 2 to 6 carbon atoms, g is 1 or 2, when g is 1, $R_{31}$ is defined as $R_1$ above when n is 1, when g is 2, $R_{31}$ is defined as $R_1$ above when n is 2, in formula G and G*, $Q_1$ is $—NR_{41}—$ or $—O—$, $E_1$ is alkylene of 1 to 3 carbon atoms, or $E_1$ is $—CH_2—CH(R_{42})—O—$ where $R_{42}$ is hydrogen, methyl or phenyl, or $E_1$ is $—(CH_2)_3—NH—$ or $E_1$ is a direct bond, $R_{40}$ is hydrogen or alkyl of 1 to 18 carbon atoms, $R_{41}$ is hydrogen, alkyl of 1 to 18 carbon atoms, cycloalkyl of 5 to 12 carbon atoms, aralkyl of 7 to 15 carbon atoms, aryl of 6 to 10 carbon atoms, or $R_{41}$ is $—CH_2—CH(R_{42})—OH$ where $R_{42}$ is as defined above, in formula H and H*, p is 1 or 2, $T_4$ is as defined for $R_{11}$ when x is 1 or 2, M and Y are independently methylene or carbonyl, preferably M is methylene and Y is carbonyl, in formula I and I*, this formula denotes a recurring structural unit of a polymer where $T_1$ is ethylene or 1,2-propylene or is the repeating structural unit derived from an alpha-olefin copolymer with an alkyl acrylate or methacrylate, and where q is 2 to 100, $Q_1$ is $—N(R_{41})—$ or $—O—$ where $R_{41}$ is as defined above, in formula J and J*, r is 1 or 2, $T_7$ is as defined for $R_1$ when n is 1 or 2 in formula A, in formula L and L*, u is 1 or 2, $T_{13}$ is as defined for $R_1$ when n is 1 or 2 in formula A, with the proviso that $T_{13}$ is not hydrogen when u is 1, in formula M and M*, $E_1$ and $E_2$, being different, each are $—CO—$ or $—N(E_5)—$ where $E_5$ is hydrogen, alkyl of 1 to 12 carbon atoms or alkoxycarbonylalkyl of 4 to 22 carbon atoms, $E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms, $E_4$ is hydrogen, alkyl of 1 to 30 carbon atoms, phenyl, naphthyl or phenylalkyl of 7 to 12 carbon atoms, or $E_3$ and $E_4$ together are polymethylene of 4 to 17 carbon atoms, or said polymethylene substituted by one to four alkyl of 1 to 4 carbon atoms, preferably methyl, in formula N and N*, $R_1$ is as defined for $R_1$ in formula A when n is 1, $G_3$ is a direct bond, alkylene of 1 to 12 carbon atoms, phenylene or $—NH-G_1-NH—$ where $G_1$ is alkylene of 1 to 12 carbon atoms, in formula O and O*, $R_{10}$ is as defined for $R_{10}$ in formula C, in formula P and P*, $E_6$ is an aliphatic or aromatic tetravalent radical, preferably neopentanetetrayl or benzenetetrayl, in formula T and T*, $R_{51}$ is hydrogen, alkyl of 1 to 18 carbon atoms, cycloalkyl of 5 to 12 carbon atoms, or aryl of 6 to 10 carbon atoms, $R_{52}$ is hydrogen or alkyl of 1 to 18 carbon atoms, or $R_{51}$ and $R_{52}$ together of alkylene of 4 to 8 carbon atoms, f is 1 or 2, when f is 1, $R_{50}$ is as defined for $R_{11}$ in formula C when x is 1, or $R_{50}$ is $—(CH_2)_zCOOR_{54}$ where z is 1 to 4 and $R_{54}$ is hydrogen or alkyl of 1 to 18 carbon atoms, or $R_{54}$ is a metal ion from the 1st, 2nd or 3rd group of the periodic table or a group $—N(R_{55})_4$ where $R_{55}$ is hydrogen, alkyl of 1 to 12 carbon atoms or benzyl, when f is 2, $R_{50}$ is as defined for $R_{11}$ in formula C when x is 2, in formula U and U*, $R_{53}$, $R_{54}$, $R_{55}$ and $R_{56}$ are independently alkyl of 1 to 4 carbon atoms or are together pentamethylene, in formula V and V*, $R_{57}$, $R_{58}$, $R_{59}$ and $R_{60}$ are independently alkyl of 1 to 4 carbon atoms or are together pentamethylene, in formula W and W*, $R_{61}$, $R_{62}$, $R_{63}$ and $R_{64}$ are independently alkyl of 1 to 4 carbon atoms or are together pentamethylene, $R_{65}$ is alkyl of 1 to 5 carbon atoms, M is hydrogen or oxygen, wherein in formulas X to CC and X* to CC* n is 2 to 3, $G_1$ is hydrogen, methyl, ethyl, butyl or benzyl, m is 1 to 4, x is 1 to 4, when x is 1, $R_1$ and $R_2$ are independently alkyl of 1 to 18 carbon atoms, said alkyl interrupted by one to five oxygen atoms, said alkyl substituted by 1 to 5 hydroxyl groups or said alkyl both interrupted by said oxygen atoms and substituted by said hydroxyl groups; cycloalkyl of 5 to 12 carbon atoms, aralkyl of 7 to 15 carbon atoms, aryl of 6 to 10 carbon atoms or said aryl substituted by one to three alkyl of 1 to 8 carbon atoms, or $R_1$ is also hydrogen, or $R_1$ and $R_2$ are together tetramethyl, pentamethylene, hexamethylene or 3-oxapentamethylene, when x is 2, $R_1$ is hydrogen, alkyl of 1 to 8 carbon atoms, said alkyl interrupted by one or two oxygen atoms, said alkyl substituted by a hydroxyl group, or said alkyl both interrupted by one or two oxygen atoms and substituted by a hydroxyl group, $R_2$ is alkylene of 2 to 18 carbon atoms, said alkylene interrupted by one to five oxygen atoms, said alkylene substituted by 1 to 5 hydroxyl groups or said alkylene both interrupted by said oxygen atoms and substituted by said hydroxyl groups; o-, m- or p-phenylene or said phenylene substituted by one or two alkyl of 1 to 4 carbon atoms, or $R_2$ is $—(CH_2)_kO[(CH_2)_kO]_h(CH_2)_k—$ where k is 2 to 4 and h is 1 to 40, or $R_1$ and $R_2$ together with the two N atoms to which they are attached are piperazin-1,4-diyl, when x is 3, $R_1$ is hydrogen, $R_2$ is alkylene of 4 to 8 carbon atoms interrupted by one nitrogen atom, when x is 4, $R_1$ is hydrogen, $R_2$ is alkylene of 6 to 12 carbon atoms interrupted by two nitrogen atoms, $R_3$ is hydrogen, alkyl of 1 to 8 carbon atoms, said alkyl interrupted by one or two oxygen atoms, said alkyl substituted by a hydroxyl group, or both interrupted by one or two oxygen atoms and substituted by a hydroxyl group, p is 2 or 3, and
Q is an alkali metal salt, ammonium or $N^+(G_1)_4$,
and in formula DD and DD*
m is 2 or 3,
when m is 2, G is $—(CH_2CHR—O)_rCH_2CHR—$, where r is 0 to 3, and R is hydrogen or methyl, and
when m is 3, G is glyceryl,
in formula EE and EE*
$G_2$ is —CN, —$CONH_2$ or —$COOG_3$ where $G_3$ is hydrogen, alkyl of 1 to 18 carbon atoms or phenyl,
X is an inorganic or organic anion,
where the total charge of cations h is equal to the total charge of anions j; and
wherein in formulas III to IIIc
$A_{11}$ is $OR_{101}$ or $NR_{111}R_{112}$
$R_{101}$ is alkenyl of 2 to 4 carbon atoms, propargyl, glycidyl, alkyl of 2 to 6 carbon atoms interrupted by one or two oxygen atoms, substituted by one to three hydroxyl groups or both interrupted by said oxygen atoms and substituted by said hydroxyl groups, or $R_{101}$ is alkyl of 1 to 4 carbon atoms substituted by carboxy or by the alkali metal, ammonium or $C_1$-$C_4$alkylammonium salts thereof; or $R_{101}$ is alkyl substituted by —$COOE_{10}$ where $E_{10}$ is methyl or ethyl,
$R_{102}$ is alkyl of 3 to 5 carbon atoms interrupted by —COO— or by —CO—, or $R_{102}$ is —$CH_2(OCH_2CH_2)_cOCH_3$ where c is 1 to 4; or
$R_{102}$ is —$NHR_{103}$ where $R_{103}$ is alkyl of 1 to 4 carbon atoms,
a is 2 to 4,
when a is 2, $T_{11}$ is —$(CH_2CHR_{100}—O)_dCH_2CHR_{100}—$, where d is 0 or 1, and $R_{100}$ is hydrogen or methyl,
when a is 3, $T_{11}$ is glyceryl,
when a is 4, $T_{11}$ is neopentanetetrayl,
b is 2 or 3,
when b is 2, $G_{11}$ is —$(CH_2CHR_{100}—O)_eCH_2CHR_{100}—$, where e is 0 to 3, and $R_{100}$ is hydrogen or methyl, and
when b is 3, $G_{11}$ is glyceryl;
$R_{111}$ is hydrogen, alkyl of 1 to 4 carbon atoms, or said alkyl substituted by one or two hydroxyl, interrupted by one or two oxygen atoms, or both substituted by one hydroxyl and interrupted by one or two oxygen atoms,
$R_{112}$ is —CO—$R_{113}$ where $R_{113}$ has the same meaning as $R_{111}$, or $R_{113}$ is —$NHR_{114}$ wherein $R_{114}$ is alkyl of 1 to 4 carbon atoms, said alkyl substituted by one or two hydroxyl, substituted by alkoxy of 1 to 2 carbon atoms, or said alkyl both substituted by one hydroxyl and by one alkoxy of 1 to 2 carbon atoms, or
$R_{111}$ and $R_{112}$ together are —CO—$CH_2CH_2$—CO—, —CO—CH=CH—CO— or —$(CH_2)_6$—CO—; and
with the proviso that, when $R_{113}$ is alkyl of 1 to 4 carbon atoms, $R_{111}$ is not hydrogen.

3. A method according to claim 1 where in the compound of component (b), X is phosphate, carbonate, bicarbonate, nitrate, chloride, bromide, bisulfite, sulfite, bisulfate, sulfate, borate, carboxylate, citrate, an alkylsulfonate or an arylsulfonate, or a phosphonate.

4. A method according to claim 2 wherein the compound of component (b) is selected from the compounds of formulae A, A*, B, B*, C, C*, D, D*, Q, Q*, R, R*, S or S*, X, X*, Y, Y*, Z and Z* where E is oxyl, hydroxyl, hydrogen or methyl and R is hydrogen,
E' is hydroxyl, hydrogen or methyl,
in formula A and A*
n is 1 or 2,
when n is 1,
$R_1$ is hydrogen, alkyl of 1 to 6 carbon atoms, alkenyl of 2-6 carbon atoms, propargyl, glycidyl, alkyl of 2 to 20 carbon atoms interrupted by one to ten oxygen atoms, said alkyl substituted by one to five hydroxyl groups or both interrupted by said oxygen atoms and substituted by said hydroxyl groups, or
$R_1$ is alkyl of 1 to 4 carbon atoms substituted by a carboxy group or by —COOZ where Z is hydrogen or alkyl of 1 to 4 carbon atoms,
when n is 2,
$R_1$ is alkylene of 1 to 8 carbon atoms, alkenylene of 4 to 8 carbon atoms, alkylene of 1 to 20 carbon atoms interrupted by one to ten oxygen atoms, substituted by one to five hydroxyl groups or both interrupted by said oxygen atoms and substituted by said hydroxyl groups,
in formula B and B*
m is 1 or 2
when m is 1,
$R_2$ is alkyl of 1 to 4 carbon atoms or $R_2$ is $CH_2(OCH_2CH_2)_nOCH_3$ where n is 1 to 12, or
$R_2$ is phenyl, or said phenyl substituted by one to three methyl groups, or
$R_2$ is —$NHR_3$ where $R_3$ is alkyl of 1 to 4 carbon atoms or phenyl, or said phenyl substituted by one or two methyl groups,
when m is 2,
R is alkylene of 1 to 8 carbon atoms, alkenylene of 4 to 8 carbon atoms, or $R_2$ is —$CH_2(OCH_2CHO_nOCH_2$— where n is 1 to 12,
$R_2$ is $NHR_4NH$ where $R_4$ is of 2 to 6 carbon atoms, aralkylene of 8 to 15 carbon atoms or arylene of 6 to 12 carbon atoms, or
$R_2$ is —CO— or —NHCONH,
in formula C and C*,
$R_{10}$ is hydrogen or, alkanoyl of 1 to 3 carbon atoms,
x is 1 or 2,
when x is 1,
$R_{11}$ is hydrogen, alkyl of 1 to 6 carbon atoms or glycidyl, or
$R_{11}$ is alkyl of 1 to 4 carbon atoms substituted by a carboxy group or by COOZ where Z is hydrogen or alkyl of 1 to 4 carbon atoms,
when x is 2,
$R_{11}$ is alkylene of 1 to 6 carbon atoms,
in formula D and D*,
$R_{10}$ is hydrogen,
y is 1 or 2,
$R_{12}$ is defined as $R_2$ above,
in formula Y, Y*, Z and Z*,
x is 1 or 2,
when x is 1,
$R_1$ and $R_2$ are independently alkyl of 1 to 4 carbon atoms, or $R_1$ and $R_2$ are together tetramethylene, or pentamethylene,
$R_2$ is hydrogen or alkyl of 1 to 4 carbon atoms, said alkyl group substituted by a hydroxyl group,
when x is 2,
$R_1$ is hydrogen, alkyl of 1 to 4 carbon atoms, said alkyl substituted by a hydroxyl group,
$R_2$ is alkylene of 2 to 6 carbon atoms,
$R_3$ is as defined above.

5. A method according to claim 3 wherein the compound of component (b) is selected from the compounds of formulae A, A*, B, B*, C, C*, D, D*, Q, Q*, R and R*
where E is oxyl, hydroxyl, hydrogen or methyl,
E' is hydrogen, hydroxyl or methyl,
R is hydrogen,
in formula A and A*,
h is 1,
$R_1$ is hydrogen, alkyl of 1 to 4 carbon atoms, glycidyl, alkyl of 2 to 4 carbon atoms interrupted by one or two oxygen atoms, said alkyl substituted by one or two hydroxyl groups or both interrupted by said oxygen atoms and substituted by said hydroxyl groups, or $R_1$ is alkyl of 1 to 4 carbon atoms substituted by —COOZ where Z is hydrogen or alkyl of 1 to 4 carbon atoms, in formula B and B*, m is 1 or 2, $R_2$ is alkyl of 1 to 4 carbon atoms or $R_2$ is $CH_2(OCH_2CH_2)_nOCH_3$ where n is 1 to 4, when m is 2, R is alkylene of 1 to 8 carbon atoms, in formula C and C*, $R_{10}$ is hydrogen or alkanoyl of 1 or 2 carbon atoms, x is 1 or 2, when x is 1, $R_{11}$ is hydrogen, alkyl of 1 to 4 carbon atoms or glycidyl, or $R_{11}$ is alkyl of 1 to 4 carbon atoms substituted by COOZ where Z is hydrogen or alkyl of 1 to 4 carbon atoms, when x is 2, $R_{11}$ is alkylene of 1 to 6 carbon atoms, in formula D and D*, $R_{10}$ is hydrogen, y is 1 or 2, $R_{12}$ is defined as $R_2$ above.

6. A method according to claim 2 wherein the compound of component (b) is bis(1-oxyl-2,2,6,6-tetramethylpiperidin-4-yl) sebacate;
bis(1-hydroxy-2,2-6-6-tetramethylpiperidin-4-yl) sebacate;
bis(1,2,2,6,6-pentamethylpiperidinium-4-yl) sebacate citrate;
bis(2,2,6,6-tetramethylpiperidinium-4-yl) sebacate citrate;
1-hydroxy-2,2,6,6-tetramethyl-4-acetoxypiperidinium citrate;
1,2,2,6,6-pentamethyl-4-acetoxypiperidinium citrate;
2,2,6,6-pentamethyl-4-acetoxypiperidinium citrate
1-oxyl-2,2,6,6-tetramethyl-4-acetamidopiperidine;
1-hydroxy-2,2,6,6-tetramethyl-4-acetamidopiperidine;
1-hydroxy-2,2,6,6-tetramethyl-4-acetamidopiperidinium bisulfate;
1,2,2,6,6-pentamethyl-4-acetamidopiperidinium bisulfate;
2,2,6,6-tetramethyl-4-acetamidopiperidinium bisulfate;
1-oxyl-2,2,6,6-tetramethyl-4-oxo-piperidine;
1-hydroxy-2,2,6,6-tetramethyl-4-oxo-piperidine;
1-hydroxy-2,2,6,6-tetramethyl-4-oxo-piperidinium acetate;
1,2,2,6,6-pentamethyl-4-oxo-piperidinium acetate;
2,2,6,6-tetramethyl-4-oxo-piperidinium acetate;
1-oxyl-2,2,6,6-tetramethyl-4-methoxy-piperidine;
1-hydroxy-2,2,6,6-tetramethyl-4-methoxy-piperidine;
1-hydroxy-2,2,6,6-tetramethyl-4-methoxy-piperidinium acetate;
1,2,2,6,6-pentamethyl-4-methoxy-piperidinium acetate;
2,2,6,6-tetramethyl-4-methoxy-piperidinium acetate;
1-oxyl-2,2,6,6-tetramethyl-4-acetoxypiperidine;
1-hydroxy-2,2,6,6-tetramethyl-4-acetoxypiperidine;
1-oxyl-2,2,6,6-tetramethyl-4-propoxy-piperidine;
1-hydroxy-2,2,6,6-tetramethyl-4-propoxy-piperidinium acetate;
1,2,2,6,6-pentamethyl-4-propoxy-piperidinium acetate;
2,2,6,6-tetramethyl-4-propoxy-piperidinium acetate;
1-hydroxy-2,2,6,6-tetramethyl-4-propoxy-piperidine;
1-oxyl-2,2,6,6-tetramethyl-4-(2-hydroxy-4-oxapentoxy)piperidine;
1-hydroxy-2,2,6,6-tetramethyl-4-(2-hydroxy-4-oxapentoxy)piperidinium acetate;
1,2,2,6,6-pentamethyl-4-(2-hydroxy-4-oxapentoxy)piperidinium acetate;
2,2,6,6-tetramethyl-4-(2-hydroxy-4-oxapentoxy)piperidinium acetate;
1-oxyl-2,2,6,6-tetramethyl-4-hydroxypiperidine;
1-hydroxy-2,2,6,6-tetramethyl-4-hydroxypiperidine;
1-hydroxy-2,2,6,6-tetramethyl-4-hydroxypiperidinium chloride;
1,2,2,6,6-pentamethyl-4-hydroxypiperidinium chloride;
2,2,6,6-tetramethyl-4-hydroxypiperidinium chloride;
1-hydroxy-2,2,6,6-tetramethyl-4-hydroxypiperidinium acetate;
1,2,2,6,6-pentamethyl-4-hydroxypiperidinium acetate;
2,2,6,6-pentamethyl-4-hydroxypiperidinium acetate;
1-hydroxy-2,2,6,6-tetramethyl-4-hydroxypiperidinium bisulfate;
1,2,2,6,6-pentamethyl-4-hydroxypiperidinium bisulfate;
2,2,6,6-tetramethyl-4-hydroxypiperidinium bisulfate;
1-hydroxy-2,2,6,6-tetramethyl-4-hydroxypiperidinium citrate;
1,2,2,6,6-pentamethyl-4-hydroxypiperidinium citrate;
2,2,6,6-tetramethyl-4-hydroxypiperidinium citrate;
bis(1-hydroxy-2,2,6,6-tetramethyl-4-hydroxypiperidinium) citrate;
bis(1,2,2,6,6-pentamethyl-4-hydroxypiperidinium) citrate;
bis(2,2,6,6-tetramethyl-4-hydroxypiperidinium) citrate;
tris(1-hydroxy-2,2,6,6-tetramethyl-4-hydroxypiperidinium) citrate;
tris(1,2,2,6,6-pentamethyl-4-hydroxypiperidinium) citrate;
tris(2,2,6,6-tetramethyl-4-hydroxypiperidinium) citrate;
tetra(1-hydroxy-2,2,6,6-tetramethyl-4-hydroxypiperidinium) ethylenediaminetetraacetate;
tetra(1,2,2,6,6-pentamethyl-4-hydroxypiperidinium) ethylenediaminetetraacetate;
tetra(2,2,6,6-tetramethyl-4-hydroxypiperidinium) ethylenediaminetetraacetate;
tetra(1-hydroxy-2,2,6,6-tetramethyl-4-acetamidopiperidinium) ethylenediaminetetraacetate;
tetra(1,2,2,6,6-pentamethyl-4-acetamidopiperidinium) ethylenediaminetetraacetate;
tetra(2,2,6,6-tetramethyl-4-acetamidopiperidinium) ethylenediaminetetraacetate;
tetra(1-hydroxy-2,2,6,6-tetramethyl-4-oxopiperidinium) ethylenediaminetetraacetate;
tetra(1,2,2,6,6-pentamethyl-4-oxopiperidinium) ethylenediaminetetraacetate;
tetra(2,2,6,6-tetramethyl-4-oxopiperidinium) ethylenediaminetetraacetate;
penta(1-hydroxy-2,2,6,6-tetramethyl-4-hydroxypiperidinium) diethylenetriaminepentaacetate;
penta(1,2,2,6,6-pentamethyl-4-hydroxypiperidinium) diethylenetriaminepentaacetate;
penta(2,2,6,6-tetramethyl-4-hydroxypiperidinium) diethylenetriaminepentaacetate;
penta(1-hydroxy-2,2,6,6-tetramethyl-4-acetamidopiperidinium) diethylenetriaminepentaacetate;
penta(1,2,2,6,6-pentamethyl-4-acetamidopiperidinium) diethylenetriaminepentaacetate;
penta(2,2,6,6-tetramethyl-4-acetamidopiperidinium) diethylenetriaminepentaacetate;

penta(1-hydroxy-2,2,6,6-tetramethyl-4-oxopiperidinium) diethylenetriaminepentaacetate;
penta(1,2,2,6,6-pentamethyl-4-oxopiperidinium) diethylenetriaminepentaacetate;
penta(2,2,6,6-tetramethyl-4-oxopiperidinium) diethylenetriaminepentaacetate;
tri(1-hydroxy-2,2,6,6-tetramethyl-4-hydroxypiperidinium) nitrilotriacetate;
tri(1,2,2,6,6-pentamethyl-4-hydroxypiperidinium) nitrilotriacetate;
tri(2,2,6,6-tetramethyl-4-hydroxypiperidinium) nitrilotriacetate;
tri(1-hydroxy-2,2,6,6-tetramethyl-4-acetamidopiperidinium) nitrilotriacetate;
tri(1,2,2,6,6-pentamethyl-4-acetamidopiperidinium) nitrilotriacetate;
tri(2,2,6,6-tetramethyl-4-acetamidopiperidinium) nitrilotriacetate;
tri(1-hydroxy-2,2,6,6-tetramethyl-4-oxopiperidinium) nitrilotriacetate;
tri(1,2,2,6,6-pentamethyl-4-oxopiperidinium) nitrilotriacetate;
tri(2,2,6,6-tetramethyl-4-oxopiperidinium) nitrilotriacetate;
penta(1-hydroxy-2,2,6,6-tetramethyl-4-hydroxypiperidinium) diethylenetriaminepentamethylenephosphonate;
penta(1,2,2,6,6-pentamethyl-4-hydroxypiperidinium) diethylenetriaminepentamethylenephosphonate;
penta(2,2,6,6-tetramethyl-4-hydroxypiperidinium) diethylenetriaminepentamethylenephosphonate;
penta(1-hydroxy-2,2,6,6-tetramethyl-4-acetamidopiperidinium) diethylenetriaminepentamethylenephosphonate;
penta(1,2,2,6,6-pentamethyl-4-acetamidopiperidinium) diethylenetriaminepentamethylenephosphonate;
penta(2,2,6,6-tetramethyl-4-acetamidopiperidinium) diethylenetriaminepentamethylenephosphonate;
penta(1-hydroxy-2,2,6,6-tetramethyl-4-oxopiperidinium) diethylenetriaminepentamethylenephosphonate;
penta(1,2,2,6,6-pentamethyl-4-oxopiperidinium) diethylenetriaminepentamethylenephosphonate;
penta(2,2,6,6-tetramethyl-4-oxopiperidinium) diethylenetriaminepentamethylenephosphonate;
4-hydroxy-tetramethylpiperidine;
1-hydroxy-2,2,6,6-tetramethyl-piperidinium citrate;
1,2,2,6,6-pentamethyl-piperidinium citrate;
2,2,6,6-tetramethyl-piperidinium citrate;
1-hydroxy-2,2,6,6-tetramethylpiperidine;
1-hydroxy-2,2,6,6-tetramethylpiperidinium chloride;
1,2,2,6,6-pentamethylpiperidinium chloride;
2,2,6,6-tetramethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
2,2,6,6-tetramethyl-4-oxo-piperidine;
1,2,2,6,6-pentamethylpiperidine;
1,2,2,6,6-pentamethyl-4-oxo-piperidine;
or 1,2,2,6,6-pentamethylpiperidine-4-hydroxy-piperidine.

7. method according to claim 6 wherein the compound of component b) is
1-oxyl-2,2,6,6-tetramethyl-4-hydroxypiperidine;
1-hydroxy-2,2,6,6-tetramethyl-4-hydroxypiperidine;
1-hydroxy-2,2,6,6-tetramethyl-4-hydroxypiperidinium chloride;
1,2,2,6,6-pentamethyl-4-hydroxypiperidinium chloride;
2,2,6,6-tetramethyl-4-hydroxypiperidinium chloride;
1-hydroxy-2,2,6,6-tetramethyl-4-hydroxypiperidinium acetate;
1,2,2,6,6-pentamethyl-4-hydroxypiperidinium acetate;
2,2,6,6-tetramethyl-4-hydroxypiperidinium acetate;
1-hydroxy-2,2,6,6-tetramethyl-4-hydroxypiperidinium bisulfate;
1,2,2,6,6-pentamethyl-4-hydroxypiperidinium bisulfate;
2,2,6,6-tetramethyl-4-hydroxypiperidinium bisulfate;
1-hydroxy-2,2,6,6-tetramethyl-4-hydroxypiperidinium citrate;
1,2,2,6,6-pentamethyl-4-hydroxypiperidinium citrate;
2,2,6,6-tetramethyl-4-hydroxypiperidinium citrate;
bis(1-hydroxy-2,2,6,6-tetramethyl-4-hydroxypiperidinium) citrate;
bis(1,2,2,6,6-pentamethyl-4-hydroxypiperidinium) citrate;
bis(2,2,6,6-tetramethyl-4-hydroxypiperidinium) citrate;
tris(1-hydroxy-2,2,6,6-tetramethyl-4-hydroxypiperidinium) citrate;
tris(1,2,2,6,6-pentamethyl-4-hydroxypiperidinium) citrate;
tris(2,2,6,6-tetramethyl-4-hydroxypiperidinium) citrate;
tetra(1-hydroxy-2,2,6,6-tetramethyl-4-hydroxypiperidinium) ethylenediaminetetraacetate;
tetra(1,2,2,6,6-pentamethyl-4-hydroxypiperidinium) ethylenediaminetetraacetate;
tetra(2,2,6,6-tetramethyl-4-hydroxypiperidinium) ethylenediaminetetraacetate;
tetra(1-hydroxy-2,2,6,6-tetramethyl-4-acetamidopiperidinium) ethylenediaminetetraacetate;
tetra(1,2,2,6,6-pentamethyl-4-acetamidopiperidinium) ethylenediaminetetraacetate;
tetra(2,2,6,6-tetramethyl-4-acetamidopiperidinium) ethylenediaminetetraacetate;
tetra(1-hydroxy-2,2,6,6-tetramethyl-4-oxopiperidinium) ethylenediaminetetraacetate;
tetra(1,2,2,6,6-pentamethyl-4-oxopiperidinium) ethylenediaminetetraacetate;
tetra(2,2,6,6-tetramethyl-4-oxopiperidinium) ethylenediaminetetraacetate;
penta(1-hydroxy-2,2,6,6-tetramethyl-4-hydroxypiperidinium) diethylenetriaminepentaacetate;
penta(1,2,2,6,6-pentamethyl-4-hydroxypiperidinium) diethylenetriaminepentaacetate;
penta(2,2,6,6-tetramethyl-4-hydroxypiperidinium) diethylenetriaminepentaacetate;
penta(1-hydroxy-2,2,6,6-tetramethyl-4-acetamidopiperidinium) diethylenetriaminepentaacetate;
penta(1,2,2,6,6-pentamethyl-4-acetamidopiperidinium) diethylenetriaminepentaacetate;
penta(2,2,6,6-tetramethyl-4-acetamidopiperidinium) diethylenetriaminepentaacetate;
penta(1-hydroxy-2,2,6,6-tetramethyl-4-oxopiperidinium) diethylenetriaminepentaacetate;
penta(1,2,2,6,6-pentamethyl-4-oxopiperidinium) diethylenetriaminepentaacetate;
penta(2,2,6,6-tetramethyl-4-oxopiperidinium) diethylenetriaminepentaacetate;
4-hydroxy-tetramethylpiperidine;
1-hydroxy-2,2-6-6-tetramethyl-piperidinium citrate;
1-hydroxy-2,2,6,6-tetramethylpiperidine;
1,2,2-6-6-pentamethyl-piperidinium citrate;
2, 2-6-6-tetramethyl-piperidinium citrate;

1-hydroxy-2,2,6,6-tetramethylpiperidinium chloride;
1,2,2,6,6-pentamethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
1-hydroxy-2,2,6,6-tetramethylpiperidinium citrate;
1,2,2,6,6-pentamethylpiperidinium citrate;
2,2,6,6-tetramethylpiperidinium citrate;
2,2,6,6-tetramethyl-4-oxo-piperidine
1,2,2,6,6-pentamethylpiperidine;
1,2,2,6,6-pentamethyl-4-oxo-piperidine;
or
1,2,2,6,6-pentamethylpiperidine-4-hydroxy-piperidine.

8. A method according to claim 7 wherein the hindered amine compound of component b) is
1-oxyl-2,2,6,6-tetramethyl-4-hydroxypiperidine;
1-hydroxy-2,2,6,6-tetramethyl-4-hydroxypiperidine;
1-hydroxy-2,2-6-6-tetramethyl-4-acetoxypiperidinium citrate;
1-hydroxy-2,2-6-6-tetramethyl-4-acetoxypiperidinium citrate;
1,2,2,6,6-pentamethyl-4-hydroxypiperidinium citrate;
2, 2-6-6-tetramethyl-4-acetoxypiperidinium citrate;
bis(1-hydroxy-2,2,6,6-tetrannethyl-4-hydroxypiperidinium) citrate;
bis(1,2,2,6,6-pentamethyl-4-hydroxypiperidinium) citrate;
bis(2,2,6,6-tetramethyl-4-hydroxypiperidinium) citrate;
tris(1-hydroxy-2,2,6,6-tetramethyl-4-hydroxypiperidinium) citrate;
tris(1,2,2,6,6-pentamethyl-4-hydroxypiperidinium) citrate;
tris(2,2,6,6-tetramethyl-4-hydroxypiperidinium) citrate;
1-hydroxy-2,2,6,6-tetramethylpiperidinium chloride;
1,2,2,6,6-pentamethylpiperidinium chloride;
2,2,6,6-tetramethylpiperidinium chloride;
1-hydroxy-2,2,6,6-tetramethylpiperidinium acetate;
1,2,2,6,6-pentamethylpiperidinium acetate;
2,2,6,6-tetramethylpiperidinium acetate;
1-hydroxy-2,2,6,6-tetramethylpiperidinium bisulfate;
1,2,2,6,6-pentamethylpiperidinium bisulfate;
2,2,6,6-tetramethylpiperidinium bisulfate;
2,2,6,6-tetramethyl-4-oxo-piperidine;
2,2,6,6-tetramethyl-4-oxo-piperidine;
1,2,2,6,6-pentamethylpiperidine;
1,2,2,6,6-pentamethylpiperidine;
1,2,2,6,6-pentamethyl-4-oxo-piperidine;
or
1,2,2,6,6-pentamethylpiperidine-4-hydroxy-piperidine.

9. A method according to claim 1 wherein the method further comprises coating the formed natural composite.

10. A method according to claim 1 wherein the impregnating composition additionally comprises at least one compound selected from the group consisting of an ultraviolet absorber, a hindered phenolic, antioxidant, compatibilizer, penetrant, and flame retardant.

11. A method according to claim 1 wherein the hindered amine compound b) is present in the impregnating composition in an amount of 0.1-20% by weight based on the weight of wood filler.

12. A method according to claim 1, wherein the fillers are selected from the group consisting of wood flour, saw dust, ground wood, wood particles, and wood fibers.

13. A method according to claim 10, wherein the penetrant is selected from the group consisting of alkanols, glycols, glycol ethers, glycol esters, polyglycols and PEG modified oils.

14. A method according to claim 10, wherein the ultraviolet absorber is a compound selected from the group consisting of 2-(2'-hydroxyphenyl)benzotriazoles, 2-hydroxybenzophenones, esters of substituted and unsubstituted benzoic acids, cinnamates, oxamide, 2-(2-hydroxyphenyl)-1,3,5-triazines and transparent metal oxides.

15. A method according to claim 1 wherein the melt processing is accomplished by means of injection molding, compression molding, co-kneading, pultrusion or extrusion.

16. A method according to claim 1 wherein a stabilizer is added to the melt.

17. A method according to claim 16 wherein the stabilizer is selected from the group consisting of sterically hindered phenols, derivatives of benzofuran-2-one, a phosphites, and a phosphonites or mixtures thereof.

18. A natural composite wherein the natural composite is formed using the method of claim 1.

19. An article of construction or a building material, wherein the article is formed from a natural composite according to claim 18.

20. An article of construction or building material according to claim 19 selected from the group consisting of decorative moldings inside or outside of a house, picture frames, furniture, porch decks, window moldings, window components, door components, roofing systems, siding, fencing, roofing shingles, interior automotive panels, automotive rear shelves, spare tire covers, boardwalks, docks, picnic tables, park benches, pallets and fences.

21. The method according to claim 1, wherein E is oxyl, hydroxyl or methyl.

* * * * *